(12) United States Patent
Arakawa et al.

(10) Patent No.: US 6,443,026 B1
(45) Date of Patent: Sep. 3, 2002

(54) SHIFT LEVER OPERATING APPARATUS FOR AUTOMATIC TRANSMISSION

(75) Inventors: Tetuya Arakawa; Yoshimasa Kataumi, both of Kosai (JP)

(73) Assignee: Fujikiko Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/151,315

(22) Filed: Sep. 11, 1998

(30) Foreign Application Priority Data

| Sep. 11, 1997 | (JP) | ............................................. 9-247212 |
| Sep. 11, 1997 | (JP) | ............................................. 9-247261 |
| Sep. 30, 1997 | (JP) | ............................................. 9-267412 |

(51) Int. Cl.$^7$ ............................................. B60K 20/06
(52) U.S. Cl. ............................... 74/473.32; 74/473.23; 192/220.2
(58) Field of Search ........................ 74/473.21, 473.23, 74/473.31, 473.32; 192/220, 220.1, 220.2

(56) References Cited

U.S. PATENT DOCUMENTS

| 3,540,313 | A | | 11/1970 | Maurice et al. |
| 4,928,545 | A | | 5/1990 | Singer, III |
| 4,936,431 | A | | 6/1990 | Shinpo |
| 5,022,504 | A | * | 6/1991 | Kobayashi ............... 74/473.31 |
| 5,027,931 | A | * | 7/1991 | Ratke et al. ............. 192/220.2 |
| 5,050,411 | A | | 9/1991 | Kawachi et al. |
| 5,431,267 | A | * | 7/1995 | Togano et al. ........... 74/473.23 |
| 5,566,583 | A | | 10/1996 | Suzuki |

FOREIGN PATENT DOCUMENTS

EP 0390590 A1 10/1990

OTHER PUBLICATIONS

European Search Report dated Oct. 22, 1999.

* cited by examiner

*Primary Examiner*—William C Joyce
(74) *Attorney, Agent, or Firm*—Howard & Howard

(57) ABSTRACT

A shift lever operating apparatus includes: a control tube rotatably supported; a shift lever axially attached to the control tube; a compression rod inserted into the control tube which moves in an axial direction in accordance with an operation of the shift lever and integrally rotating with the control tube; a selector member fixed to the compression rod; a detent bracket having a plurality of detent grooves with which a detent portion formed in the selector member selectively engages and being fixed to a vehicle body end. In the construction, the detent bracket is perpendicular to the control tube and rotatably supports an end portion opposite the shift lever. The detent groove is formed on the same surface as the supporting portion. The selector member is fixed to an end portion of the compression rod projecting from the end portion apart from the shift lever of the control tube.

1 Claim, 16 Drawing Sheets

SHIFT LEVER OPERATING APPARATUS FOR AUTOMATIC TRANSMISSION

BACKGROUND OF THE INVENTION

1. Field of the Invention

The present invention relates to a shift lever operating apparatus for an automatic transmission in an automotive vehicle and the like, and more particularly to a shift lever operating apparatus for an automatic transmission which is arranged in a side portion of a steering column fixed to a vehicle body end and connected to a key interlock mechanism.

2. Description of the Related Art

FIGS. 1–3 show a typical shift lever operating apparatus for an automatic transmission designed in accordance with the conventional prior art. The shift lever operating apparatus for an automatic transmission is connected to an automatic transmission through a transmitting member including a control tube 1 rotatably provided in a side portion of a steering column apparatus (not shown) and a shift lever 2 axially attached to a socket 1a provided in the control tube 1 and projecting so as to freely stand in an axial direction by a mounting pin 2a. A recess portion 3a engages a spherical engaging portion 2b formed in a base portion of the shift lever 2 and is fixed to a side portion of the steering column apparatus with a compression rod 3 sliding within the control tube 1 in an axial direction in accordance with an operation of the shift lever 2. A return spring 4 biases the compression rod 3 toward the shift lever 2 in the axial direction. A selector member 5 is fixed to the compression rod 3 and a plurality of detent grooves 6a in a detent bracket 6 selectively engage a detent portion 5c formed in the selector member 5. The detent bracket 6 rotatably supports a lower end of the control tube 1.

The selector member 5 is inserted through an insertion hole 3b formed through a middle portion of the compression rod 3 in a diametrical direction. A portion projecting from an outer peripheral surface of the compression rod 3 is slidably inserted through an oblong hole 1b formed by extending therethrough in a diametrical direction along an axis of the control tube 1.

The selector member 5 is fixed to the compression rod 3 by pressing two mounting pins 5a through the control tube 1 from a pair of aligned oblong holes 1c formed in control tube 1 in a diametrical direction along an axis perpendicular to oblong holes 1b. Both ends of each pin 5a project from the outer peripheral surface of the control tube 1 and pass through two mounting holes 3c and 5b formed in the compression rod 3 and the selector member 5 respectively. In addition, the compression rod 3 is structured to integrally rotate with the control tube 1.

The detent bracket 6 is oriented perpendicular to the control tube 1 in such a manner that the middle portion of the control tube 1 is inserted through it. A lock member 7 restricts movement in a selecting direction of the selector member 5 when the selector member is at a parking position, that is, in the direction of an arrow R shown in FIG. 1. Lock member 7 is axially attached to the detent bracket 6 by a mounting shaft 7a.

The apparatus is structured such that the selector member 5 is brought into contact with the lock member 7 and the detent 5c of the selector member 5 does not come out from the parking position groove, that is, the shift lever 2 can be locked at the parking position even by operating the shift lever 2 in a select direction, that is, a direction of an arrow S when the selector member 5 is at the parking position, that is, the detent portion 5c of the selector member 5 engages with a parking position groove of the detent groove 6a.

In the shift lever operating apparatus for an automotive vehicle described above, since the selector member 5 is arranged in the middle portion of the compression rod 3, it is difficult to mount the selector member 5 to the compression rod 3. Further, since the detent groove 6a engaging with the selector member 5 is provided at the middle portion of the control tube 1 in the detent bracket 6 supporting the lower end of the control tube 1, the detent bracket 6 is made large.

Further, when the selector member 5 is at the parking position and the shift lever 2 is locked, forceful operation of the shift lever 2 in a shift direction, for example, the direction of an arrow T (see FIG. 2), places a great load on each of the end surfaces of oblong holes 1b and 1c in the control tube 1 through the selector member 5 and pins 5a. The great load presents a risk that a portion near the oblong holes 1b and 1c will become deformed and a sliding motion of the selector member 5 is not going to be smooth. Thus, it is necessary to make the control tube 1 and the detent bracket 6 very thick to thereby prevent the portion near the oblong holes 1b and 1c and the portion near the detent groove 6a from deforming. Accordingly, the weight of the whole apparatus is increased and the apparatus becomes very large.

Further, in the shift lever operating apparatus for an automatic transmission described above, operation of the shift lever 2 in the selecting direction places a great load on compression rod 3 in the axial direction. The great load acts on the lock member 7 and mounting shaft 7a through the selector member 5 when the shift lever 2 is at the parking position thus, a thick large-sized and strong member is used for the lock member 7 and mounting the shaft 7a to sufficiently stand the great load. The lock member 7 rotates from a locked position, where the lock member 7 engages with the selector member 5, to an unlocked position, where the lock member 7 disengages with the selector member 5, by driving a solenoid as an actuator (not shown).

Accordingly, the whole apparatus becomes large and the weight thereof becomes increased. Further, since the mass of an inertia in the lock member 7 increases in accordance with an increase of the weight, when stepping on a brake to cancel an excitation of the solenoid to permit shifting the shift lever 2 from the parking position to another position rapid operation of the shift lever 2 delays rotation from a locked position of the lock member 7 to an unlocked position. In other words, the responsiveness of the lock member 7 is decreased, so that a lock removal by the lock member 7 cannot be quickly performed.

Still further, since the lock member 7 is mounted to the detent bracket 6 by the mounting shaft 7a, the space necessary for mounting and operating the lock member 7 is large, and the whole apparatus becomes large.

Furthermore, in this kind of shift lever operating apparatus for an automotive vehicle, when the shift lever is shifted to the parking position it is locked by the lock member. The lock member rotates from the locked position to the unlocked position in response to the solenoid as the actuator, as stated above.

Accordingly, it is structured so that when the shift lever is shifted to the parking position, the solenoid becomes electrified so as to rotate the lock member to the locked position, thereby locking the shift lever in the parking position. When the brake is stepped on at a time of starting the vehicle, the solenoid becomes de-electrified so as to rotate the lock member to the unlocked position, thereby shifting the shift lever from the parking position to the other position.

Further, an engine key can be removed from a key interlock mechanism only when the shift lever is shifted to the parking position. When in a parked state and the engine key is taken out the key lock lever, which is arranged between the lock member and the key interlock mechanism, is locked and the lock member, which is disposed at the locked position, is prevented from rotating in the unlocked direction by the locked key lock lever.

Then, it is structured such that when the shift lever is moved from the parking position to another position, a lock of the key lock lever is canceled by inserting the engine key into the key interlock mechanism and operating it, thereby rotating the lock member in the unlocked direction.

In such a system when an electric system malfunction occurs at the time of changing the shift lever from the parking position to another position it is possible that the solenoid will not operate. When this occurs, it is impossible to rotate the lock member to the unlocked position, so the shift lever is kept in the parking position.

Further, when the shift lever is changed from the parking position to another position, it is necessary to insert the engine key into the key interlock mechanism and operate it, thereby canceling the lock of the key lock lever. However, sometimes it is desirable to move the automotive vehicle by human power without using the engine key, thus an alternative design that would permit this would be beneficial.

SUMMARY OF THE INVENTION

The present invention has been achieved with such points in mind.

It is therefore an object of the present invention to provide a shift lever operating apparatus for an automatic transmission that has a compact and light control tube and detent bracket, that makes it easy to mount a selector member and the detent bracket, and that makes it easy to mount a control tube to the detent bracket.

Another object of the present invention is to provide a shift lever operating apparatus for an automatic transmission that is more compact by making a smaller lock member and a smaller space for mounting and operating the lock member. It is also an object to make a mounting structure of the lock member simpler.

Still another object of the present invention is to provide a shift lever apparatus for an automatic transmission that can cancel a shift lock of the shift lever shifted to the parking position by a manual operation without an engine key.

In order to achieve the objects mentioned above, in accordance with a first aspect of the present invention, there is provided a shift lever operating apparatus for an automatic transmission, comprising: a control tube rotatably supported in a side portion of a steering column; a shift lever axially attached to the control tube in such a manner as to stand in an axial direction; a compression rod inserted into the control tube, the compression rod moving in an axial direction in accordance with an operation of the shift lever and integrally rotating with the control tube; a return spring pressing the compression rod in the axial direction toward the shift lever; a selector member fixed to the compression rod; a detent bracket having a plurality of detent grooves with which a detent portion formed in the selector member selectively engages and fixed to a vehicle body end, wherein the detent bracket is perpendicular to the control tube and rotatably supports an end portion apart from the shift lever of the control tube; the detent groove is formed on the same surface as the supporting portion where the detent bracket supports the end portion of the control tube; and the selector member is fixed to an end portion of the compression rod projecting from the end portion apart from the shift lever of the control tube.

In accordance with a second aspect of the present invention, as it depends from the first aspect, the selector member is held by an arm member fixed to the end portion apart from the shift lever of the control tube, and integrally rotated with the control tube.

In accordance with a third aspect of the present invention, as it depends from the second aspect, a holding portion of the arm member is arranged near the detent bracket.

Then, in the invention in accordance with the first aspect structured in the above manner, since the detent bracket is perpendicular to the control tube and rotatably supports the end portion apart from the shift lever and the detent groove is formed on the same plane as the supporting portion, a rigidity can be improved in comparison with the conventional structure in which the detent bracket is arranged in the middle portion of the control tube, and the detent bracket can be made compact.

Further, since the selector member is fixed to the end portion of the compression rod projecting from the end portion apart from the shift lever of the control tube, it is not necessary to form an oblong hole on the outer peripheral surface of the control tube, so that the control tube can be easily processed and the rigidity can be widely improved. Accordingly, the control tube can be made compact and thin, that is, light. Further, the structure of mounting the selector member to the compression rod can be widely made simple. At a time of assembling, since the parts can be inserted into the compression rod from the end portion close to the shift lever one by one, assembly is improved.

In the invention in accordance with the second aspect, since the selector member is held by the arm member fixed to the end portion apart from the shift lever of the control tube and integrally rotated with the control tube, an operation of the shift lever can be properly transmitted to the selector member.

Further, since the selector member is held by the holding portion of the arm member, the strength can be improved with restricting the selector member from deforming, so that the selector member can be made compact and thin, that is, light.

In the invention in accordance with the third aspect, since the holding portion of the arm member is arranged near the detent bracket, the strength can be widely improved, the deformation of the selector member can be further restricted and the selector member can be further made thin and light.

In accordance with a fourth aspect of the present invention, there is provided a shift lever operating apparatus for an automatic transmission, comprising: a control tube rotatably supported in a side portion of a steering column; a shift lever axially attached to the control tube; a compression rod inserted into the control tube, the compression rod moving in an axial direction in accordance with an operation of the shift lever and integrally rotating with the control tube; a return spring pressing the compression rod in the axial direction toward the shift lever; a selector member fixed to the compression rod; a detent bracket having a plurality of detent grooves with which the selector member is selectively engaged and perpendicular to the control tube and rotatably supporting the end portion opposite the shift lever of the control tube; a lock member having a lock portion engaging with the selector member positioned at the parking position so as to restrict the operation of the shift lever in the select direction; and an actuator rotating the lock member from a locked position engaging with the selector member to an unlocked position at which the engagement is canceled, wherein the selector member has an engaging portion located apart from a side surface of the detent bracket with a predetermined interval and perpendicular to the control tube; the lock member has a base portion slidably brought into contact with the one side surface of the detent bracket and rotatably supported in a coaxial manner with the control tube; the lock portion is mounted so as to project from an outer peripheral surface of the base portion; and the lock portion moves between the engaging portion of the selector member and the one side surface of the detent bracket by driving the actuator, thereby preventing the selector member from moving in the axial direction.

Then, in the invention structured in the above manner, since it is structured such that the lock portion of the lock member moves between the one side surface of the detent bracket and the engaging portion of the selector member, thereby preventing the selector member from moving in the axial direction, the load acting on the lock member through the selector member by operating the shift lever at a time of shifting the shift lever from the parking position is directly input to the detent bracket, so that it is sufficient that the lock member has a strength enough to stand the compression force.

Accordingly, the lock member can be made compact and light, the responsiveness of the lock member can be improved by making a mass of an inertia in the lock member small, and the cost can be reduced. Further, since the lock member is slidably brought into contact with the one side surface of the detent bracket and rotatably supported in a coaxial manner within the control tube, the space for mounting and operations of the lock member can be made small, and the structure of mounting the lock member can be made simple.

In accordance with a fifth aspect of the present invention, there is provided a shift lever operating apparatus for an automatic transmission, comprising: a control tube rotatably supported in a side portion of a steering column; a shift lever axially attached to the control tube in such a manner as to stand in an axial direction; a compression rod inserted into the control tube, the compression rod moving in the axial direction in accordance with an operation of the shift lever and integrally rotating with the control tube; a selector member fixed to the compression rod; a detent bracket having a plurality of detent grooves with which the selector member selectively engages and rotatably supporting an end portion apart from the shift lever of the control tube; a lock mechanism interlocking with a key interlock mechanism structured such that an engine key can be inserted to and taken out only at a time of shifting the shift lever to a parking position, and preventing the shift lever from moving from the parking position to the other position in response to a brake, wherein the lock mechanism, comprises: a lock member restricting a selecting operation of the shift lever by engaging with the selector member positioned at the parking position, the lock member rotatably supported in a coaxial manner with the control tube in such a manner as to move from a lock position engaging with the selector member to an unlock position at which the engagement is canceled, the lock member connected to an actuator interlocking with the brake; a first key lock lever rotatably and axially attached by the detent bracket, the first key lock lever formed in such a manner as to freely engage with the selector member positioned at the parking position at a side apart from the selecting direction, the first key lock lever interlocked with the key interlock mechanism through a transmitting member a second key lock lever axially attached to the same axially attaching portion of the first key lock lever, the second key lock lever connected in such a manner as to integrally rotating with the first key lock lever by urging means, the second key lock lever being formed in an engageable manner so as to restrict a rotation to the unlock position with respect to the lock member positioned at the lock position in a state that the first key lock lever is engaged with the selector member; and a forcibly lock canceling mechanism forcibly canceling an engagement between the second key lock lever and the lock member positioned at the lock position by a manual operation, the forcibly lock canceling mechanism forcibly rotating the lock member positioned at the lock position to the unlock position by another manual operation.

Further, in accordance with a sixth aspect, as it depends from the fifth aspect, in the shift lever operating apparatus for an automatic transmission, the forcibly lock canceling mechanism further comprises: second key lock lever forcibly driving means provided in the second key lock lever in such a manner as to forcibly cancel the second key lock lever engaging with the lock member positioned at the lock position by a manual operation; and actuator forcibly driving means provided between the second key lock lever and the actuator in such a manner as to forcibly drive the actuator in an interlocking manner with a drive operation of the second key lock lever forcibly drive means and rotate the lock member positioned at the lock position to the unlock position.

Then, in the invention in accordance with the fifth aspect, as mentioned above, since the lock member positioned at the lock position can be forcibly rotated to the unlock position by the forcibly lock canceling mechanism when the shift lever is locked positioned at the parking position, the shift lock of the shift lever shifted to the parking position can be canceled and the shift lever can be changed from the parking position to the other positions even in the case that the engine key is not present, or the actuator is fixed due to a trouble in an electric system and the like.

Further, in the invention in accordance with the sixth aspect, since an engagement between the lock member positioned at the lock position and the second key lock lever can be forcibly canceled by a manual operation by means of the second key lock lever forcibly driving means, the shift lock of the shift lever shifted to the parking position can be canceled even in the case that the engine key is not present. Still further, since the lock member positioned at the lock position can be forcibly rotated to the unlock position by a manual operation by means of the actuator forcibly driving means, the shift lock of the shift lever shifted to the parking position can be canceled even in the case that the actuator does not drive due to the trouble in the electric system and the like.

BRIEF DESCRIPTION OF THE ACCOMPANYING DRAWINGS

The above and further objects and novel features of the present invention will more fully appear from the following detailed description when the same is read in conjunction with the accompanying drawings, in which.

Figure 19:
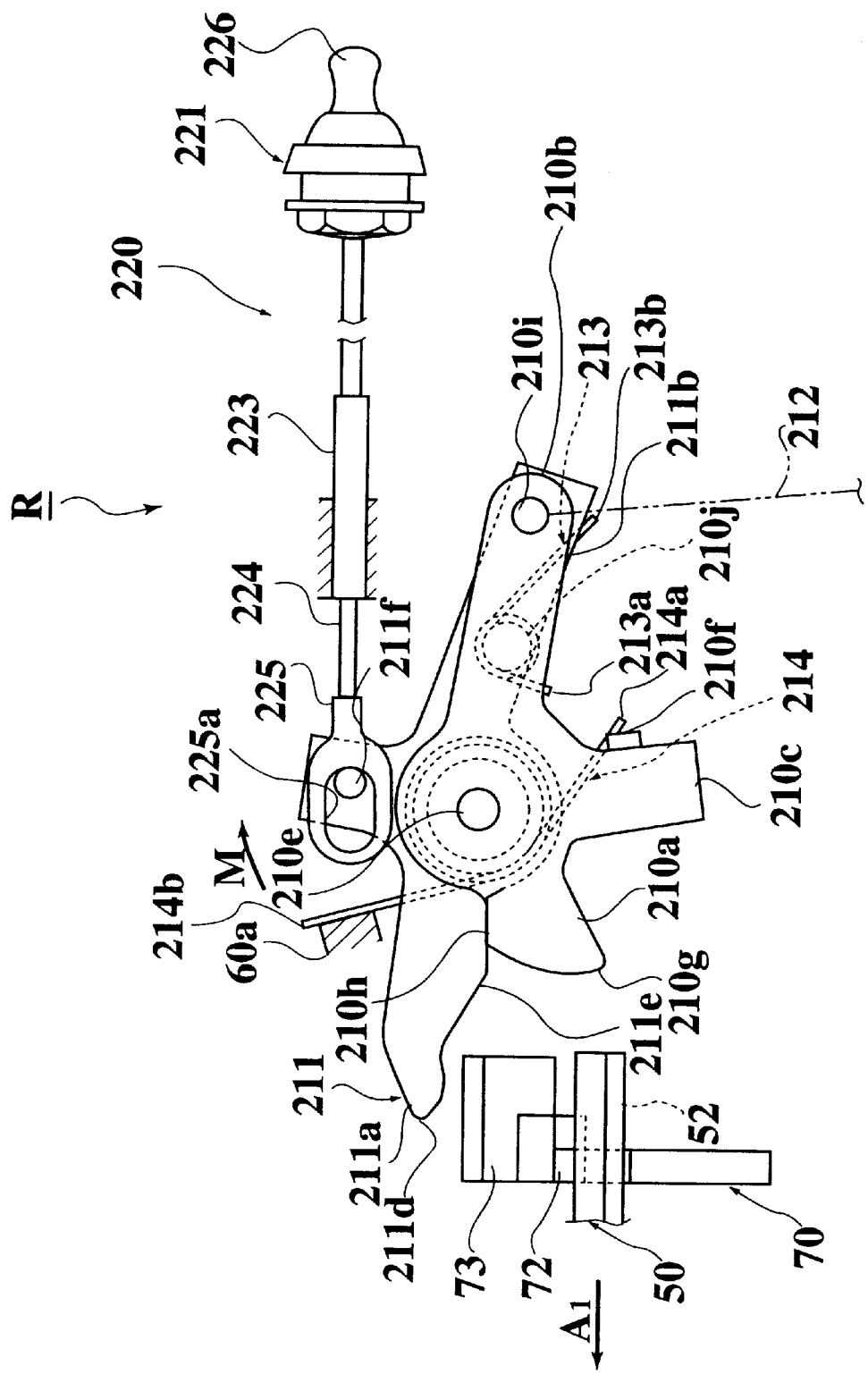
Figure 20:
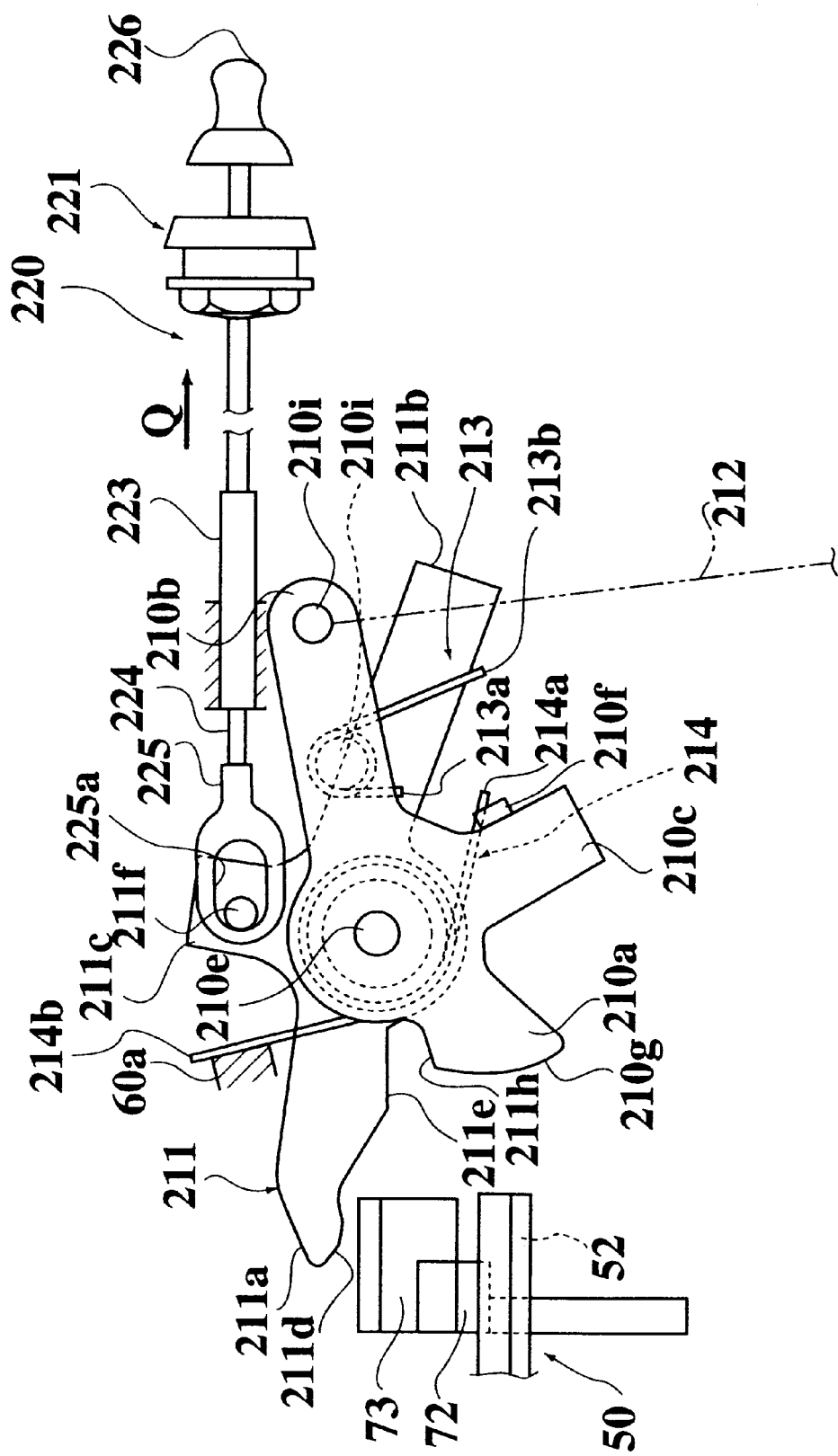

FIG. 19 is a plan view which shows a state of a forcibly lock canceling mechanism when shifting the shift lever of the shift lever operating apparatus for an automatic transmission to a running position; and FIG. 20 is a schematic view of a second key lock lever forcibly driving means of the shift lever operating apparatus for an automatic transmission designed in accordance with the present invention.

DETAILED DESCRIPTION OF THE PREFERRED EMBODIMENTS

There will be detailed below the preferred embodiments of the present invention with reference to the accompanying drawings. Like members are designated by like reference characters.

A first embodiment in accordance with the present invention will be described below with reference to FIGS. 4 to 13.

In the drawings, reference symbol E denotes a shift lever operating apparatus for an automatic transmission. The shift lever operating apparatus includes a control tube 10 rotatably mounted in a side portion of a steering column 11 (see FIG. 5), a shift lever 20 axially attached to a socket 10a provided in the control tube 10 in a projecting manner. A compression rod 30 is inserted within the control tube 10 and moves in an axial direction in accordance with operation of the shift lever 20 and integrally rotates with the control tube 10. A return spring 40 biases the compression rod 30 toward the shift lever 20 in an axial direction. A selector member 50 is fixed to the compression rod 30. A detent bracket 60 includes a plurality of detent grooves 62 which selectively engage with a detent portion 51 formed in the selector member 50. The detent bracket 60 is fixed to a vehicle body end (not shown).

Further, the detent bracket 60 extends perpendicularly to the control tube 10 and rotatably supports an end portion L1 apart from the shift lever 20 thereof. A lock member 70 having a lock portion 72 engages with the selector member 50 when it is positioned at a parking position so as to restrict operation of the shift lever 20 in a selecting direction. A solenoid 100 functions as an actuator and the rotates lock member 70 from a locked position of engagement with the selector member 50 to an unlocked position canceling the engagement.

The selector member 50 has an engaging portion 52 that is arranged between the selector member 50 and a side surface of the detent bracket 60 and extends in perpendicular orientation to the control tube 10. The lock member 70 includes a base portion 71 that is slidably brought into contact with the side surface of the detent bracket 60 and rotatably supported in a coaxial manner with the control tube 10 and a lock portion 72 provided on an outer peripheral surface of the base portion 71 in a projecting manner. The lock portion 72 moves between the engaging portion 52 of the selector member 50 and the side surface of the detent bracket 60 by a driving operation of the solenoid 100, thereby restricting movement of the selector member 50 in an axial direction.

The detent bracket 60 extends perpendicularly to the control tube 10 and rotatably supports the end portion L apart from the shift lever 20 of the control tube 10, and the detent groove 62 is formed on the same plane as the supporting portion where the detent bracket 60 supports the end portion L of the control tube 10, so that the selector member 50 is fixed to the end portion of the compression rod 30 projecting from the end portion apart from the shift lever 20 of the control tube 10.

Further, a structure of the embodiment in accordance with the present invention will be described in detail.

The control tube 10 is provided with a hollow socket 10a that projects from an end portion. A bush 12 is pressed into the end portion of the control tube 10. A mounting shaft 14 is mounted to a mounting bracket 13 which is formed from the steering column 11 that is fixed to the vehicle body, and is inserted to the bush 12. Accordingly, the one end portion of the control tube 10 is axially supported to the steering column 11 through the mounting bracket 13 in a freely rotating manner. Further, the other end portion of the control tube 10 is axially supported in a freely rotating manner by the detent bracket 60 through a mounting tube 81 of an arm member 80, described below.

A base portion of the shift lever 20 is constituted by an axially attaching portion 21 and an engaging portion 22, and a knob 23 mounted to a front end portion. The axially attaching portion 21 is axially attached to an inner portion of the socket 10a of the control tube 10 by a mounting pin 24, and the engaging portion 22 is formed in a spherical shape and engaged with a recess portion 31 formed in the compression rod 30.

The compression rod 30 is inserted into an inner portion of the control tube 10 in such a manner as to slide in an axial direction, and the end portion L1 apart from the shift lever 20 projects outwardly. Further, an oblong hole 33 loosely fitting a mounting pin 84, described below, is formed in a flat portion 32 located in a middle portion of the compression rod 30 along its axial direction. A length of this oblong hole 33 is set to be enough long not to prevent the compression rod 30 from moving in the axial direction.

Figure 2:
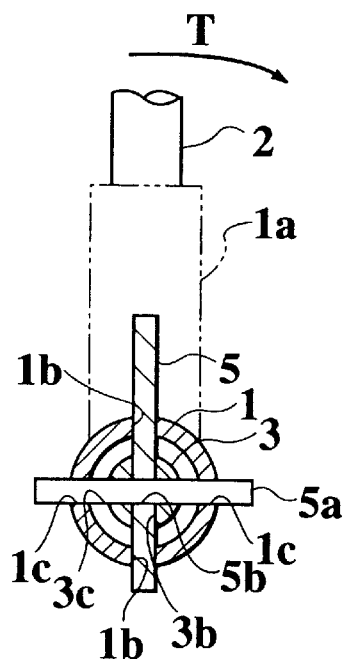
FIG. 2 is a cross-sectional view along line II—II in FIG. 1.

The return spring 40 is wound around the compression rod 30 between an end surface of a mounting tube 81 of the arm member 80 mentioned above and inserted to the inner portion of the control tube 10. A spring receiver 41 is provided in the compression rod 30 at the end surface close to the shift lever 20 through a pair of spring sheets 42, and the compression rod 30 is urged by the return spring 40 in a direction shown by an arrow A in FIG. 2 in the axial direction.

The detent bracket 60 is positioned at a leftward portion of the end portion L1 apart from the shift lever 20 of the control tube 10 and fixed to the vehicle body end and the side portion of the steering column 11, and the detent groove 62 is provided in a detent plate 61 formed in perpendicular to the axis of the control tube 10. The detent groove 62 comprises a plurality of grooves formed at positions corresponding to respective shift positions comprising a parking, a reverse, a neutral, a drive, a second speed and a first speed position.

The selector member 50 is formed in a plate shape, and is integrally fixed to the end portion L1 apart from the shift lever 20 of the compression rod 30 and outwardly projects radially from the mounting tube 81 inserted and fixed to the end portion L1 apart from the shift lever 20 of the control tube 10. A detent portion 51 comprising a plurality of step portions that selectively engage with the detent groove 62 of the detent plate 61 and an L-shaped engaging portion 52 continuously formed in the detent portion 51 are both formed in the extending front end portion.

Figure 5:
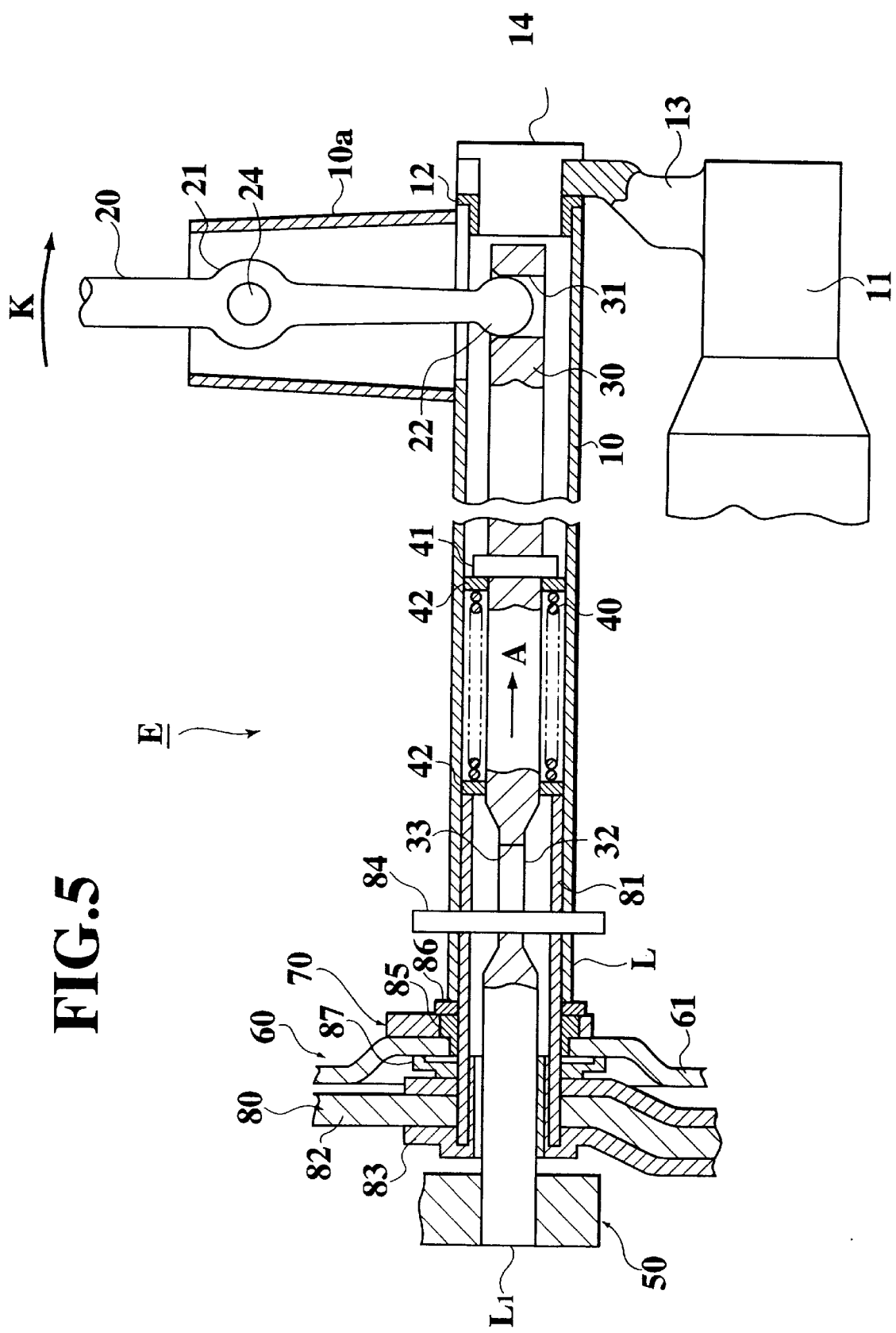
FIG. 5 is a cross sectional view of the shift lever operating apparatus for an automatic transmission designed in accordance with the present invention.
Figure 6:
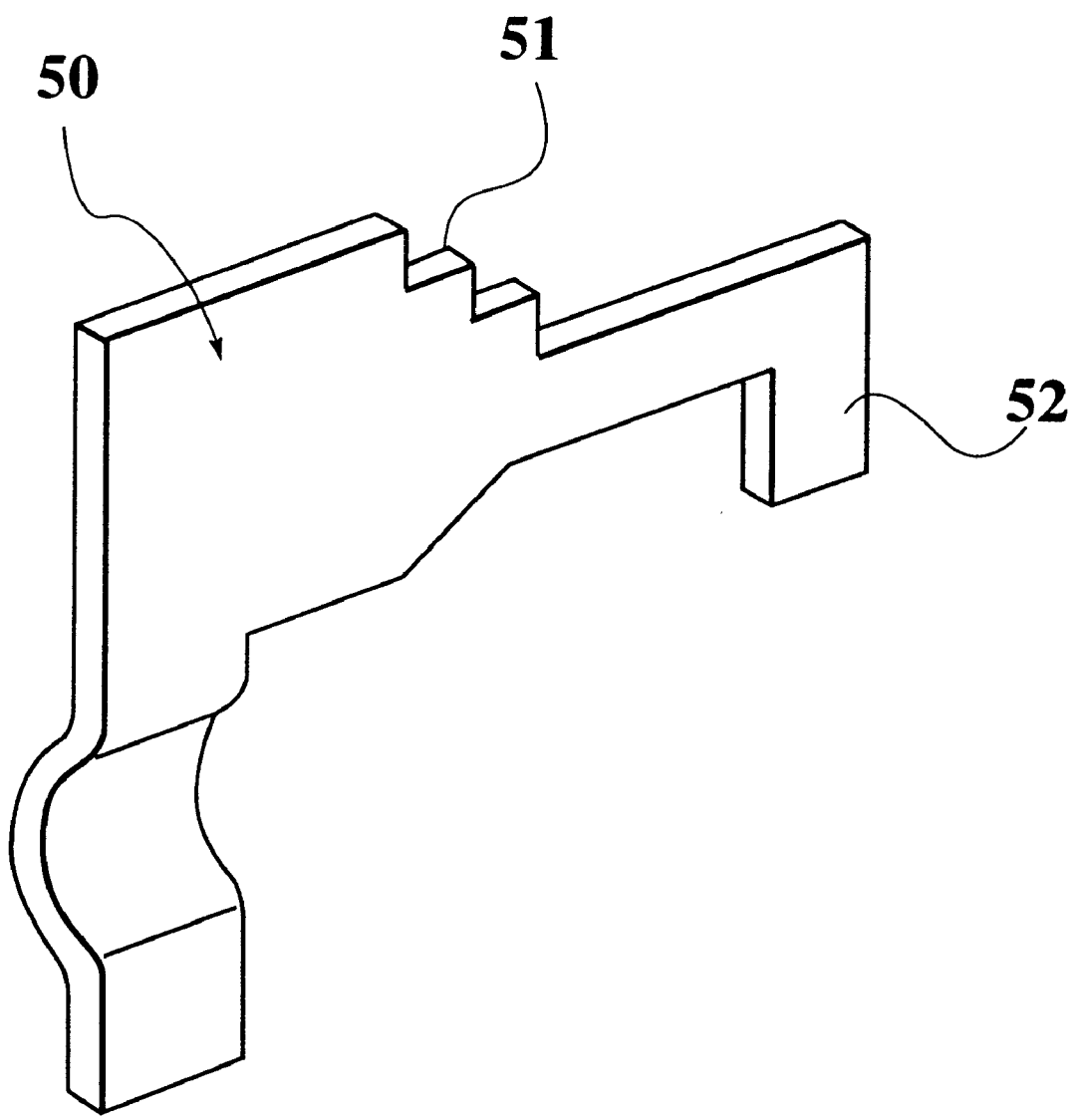
FIG. 6 is a perspective view of a selector member of the shift lever operating apparatus for an automatic transmission designed in accordance with the present invention.

The arm member 80 is constituted by a mounting tube 81 inserted into the inner portion of the control tube 10, a holding portion 82 perpendicularly fixed to a side portion of the mounting tube 81, and a synthetic resin arm portion 83 formed by inserting the holding portion 82. The mounting tube 81 is fitted to an inner peripheral surface of the end portion L1 apart from the shift lever 20 of the control tube 10 and fixed to the control tube 10 by a mounting pin 84 loosely fitted into the oblong hole 33 of the compression rod 30, and a leftward end surface of the oblong hole 33 of the compression rod 30 is always in pressing contact with the mounting pin 84 due to a spring force of the return spring 40, as shown in FIG. 5.

Further, the mounting tube 81 is inserted to each of the holes formed in each of the center portions of a bush pressed into the detent bracket 60, a spacer 86 is interposed between the bush 85 and the end portion L apart from the shift lever 20 of the control tube 10 and a spacer 87 is interposed between the detent bracket 60 and the arm portion of the arm member 80, and is fixed to the control tube 10 by the mounting pin 84 in a state of holding each of the members between the end portion L apart from the shift lever 20 of the control tube 10 and the arm portion 83, and is rotatably supported to the detent bracket 60 through the bush 85.

The holding portion 82 is arranged near the one side surface of the detent plate 61 of the detent bracket 60 and extends perpendicularly to the mounting tube 81, and holds the selector member 50 therebetween by a fork portion 82a formed at a front end. Accordingly, the selector member 50 is structured to integrally rotate with the arm member 80 and the control tube 10.

The arm portion 83 inserts the mounting tube 81 and the holding portion 82 to the base portion, and is arranged near the one side surface of the detent plate 61 and in such a manner as to substantially extend to the mounting tube 81. Further, a spherical engaging portion 83a formed and positioned at the front end portion is connected to an operating member 90, described below.

Further, a convex portion 83b is provided on an outer peripheral surface of the base portion of the arm portion 83 in a projecting manner, and it is structured such that the convex portion 83b is brought into contact with a contact point 104a of a park switch 104 provided in the detent bracket 60 when the detent portion 51 of the selector member 50 is in a state of capable of engaging with the parking position groove, that is, when the shift lever 20 is set to be at the parking position, thereby turning on the park switch 104 and exciting a solenoid 100, described below.

An operating member 90 is constituted by a main body portion 91 made of a synthetic resin and a metal operating arm portion 92 inserted in the resin. The main body portion 91 is arranged in parallel to the axis of the control tube 10 and axially attached to the detent bracket 60 by a mounting shaft 93. Further, an oblong engaging hole 91a, with which the engaging portion 83a of the arm portion 83 engages, is formed in the main body portion 91.

Further, a fan-like moderation applying portion 94 having the mounting shaft 93 as a center is integrally formed near the axially attaching portion of the main body portion 91, and a plurality of moderation grooves 94a are formed on an outer peripheral surface of the moderation applying portion 94. Then, a moderation feeling in a shift operation is applied by bringing a plate-like spring member 95 mounted to the detent bracket 60 into contact with the moderation grooves 94a (see FIG. 9).

It is structured such that the operating arm portion 92 is formed in a crank shape, constituted by an arm portion 92a inserted to the main body portion 91 and an arm portion 92b, which is substantially perpendicular to the arm portion 92a. A cable 97, interlocking with the automatic transmission (not shown) is connected and pivotally supported on a connecting pin 96 provided at a front end of the arm portion 92b, thereby operating the automatic transmission through the cable 97.

The lock member 70 includes a ring-like base portion 71 held between the detent bracket 60 and the spacer 86 and is rotatably supported to the bush 85 pressed into the detent bracket 60. The lock member 70 also includes a lock portion 72, a key lock lever engaging portion 73, and a connecting portion 74 provided on an outer peripheral surface of the base portion 71 in a projecting manner. The base portion 71 and the lock portion 72 are arranged in such a manner as to slidably bring a leftward side surface into contact with a rightward side surface of the detent plate 61, as shown in FIG. 5, and the key lock lever engaging portion 73 is arranged perpendicular to the lock portion 72.

Figure 8:
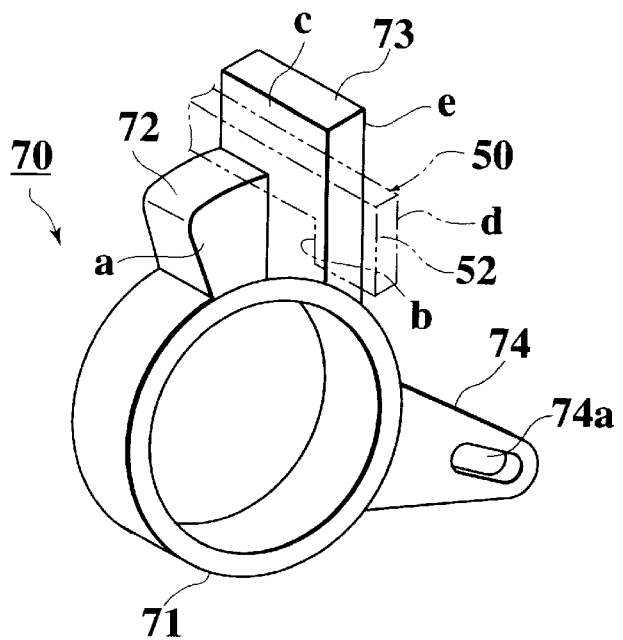
FIG. 8 is a perspective view of a lock member of the shift lever operating apparatus for an automatic transmission designed in accordance with the present invention.
Figure 9:
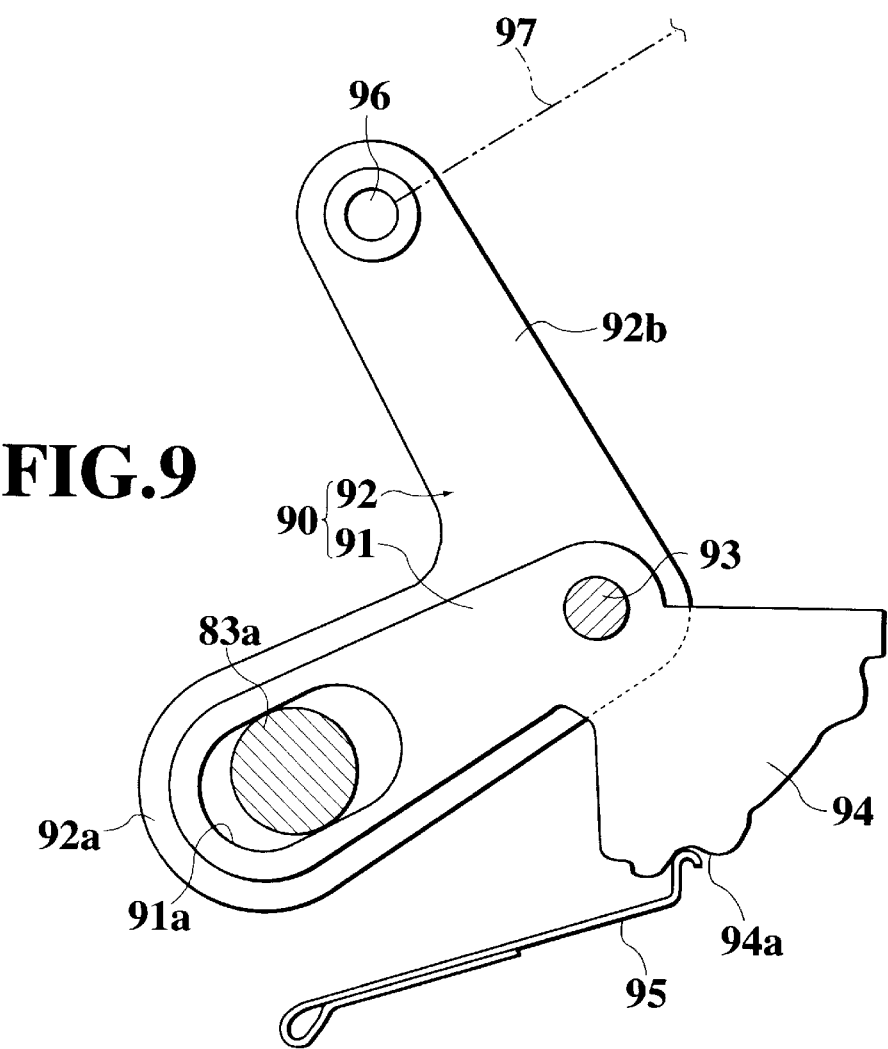
FIG. 9 is a front elevational view of an operating member in the shift lever operating apparatus for an automatic transmission designed in accordance with the present invention.

Then, it is set such that an a surface in the lock portion 72 opposes a b surface in the engaging portion 52 of the selector member 50 with a predetermined interval and a c surface in the key lock lever engaging portion 73 is brought into contact with a d surface in the engaging portion 52, as shown in FIG. 8 at a time of engaging the selector member 50 with the parking position groove of the detent groove 62. Further, the lock member 70 is structured such as to be operated by a solenoid 100 as an actuator. The solenoid 100 is received within a solenoid case 101 fixed to the detent bracket 60, and a plunger 102 partly projecting outwardly is slidably installed therein. The plunger 102 is urged in such a manner as to be outward projected by a compression spring (not shown), and it is set that when the park switch 104 is turned on, the solenoid 100 is excited and sucks the plunger 102 inwardly.

Further, a crank-like link member 103 made of a synthetic resin is axially attached to the solenoid case 101 by a mounting pin 103a, and a hook portion 102a formed in a front end of the plunger 102 is loosely fitted into an oblong hole 103b formed in one of front ends of links member 103. Still further, an engaging pin 103c formed in the other of the front ends of the link member 103 is loosely fitted into an oblong hole 74a formed in a connecting portion 74 provided on the outer peripheral surface of the base portion 71 in the lock member 70 in a projecting manner.

Furthermore, the lock member 70 when positioned at the locked position is prevented from rotating in a direction to cancel the lock by the key lock lever 110. The key lock lever 110, which is made of a synthetic resin, is arranged perpendicular to the lock portion 72 of the lock member 70 and is constituted by arm portions 110a, 110b and 110c that extend in three portions from a base portion. The base portion is axially attached to the detent bracket 60 by a pivot 111, and a torsion coil spring 112 is wound around the pivot 111. One hook portion 112a of the torsion coil spring 112 and the other hook portion 112b are, respectively, engaged with a locking pin 110d formed in arm portion 110a and a locking portion 60a formed in the detent bracket 60. The key lock lever 110 is urged by the torsion coil spring 112 in such a manner as to rotate in a direction of an arrow B in FIG. 12.

A key lock cable 114 interlocking with the key interlock mechanism is connected to a mounting pin 113 formed in the front end of arm portion 110a of the key lock lever 110. Further, a cam surface 110e formed in the arm portion 110b is brought into contact with the engaging portion 52 of the selector member 50 when it is positioned at the parking position. A convex portion 110f capable of being brought into contact with an e surface of the key lock lever engaging portion 73 of the lock member 70 is formed at the front end in the arm portion 110.

Figure 12:
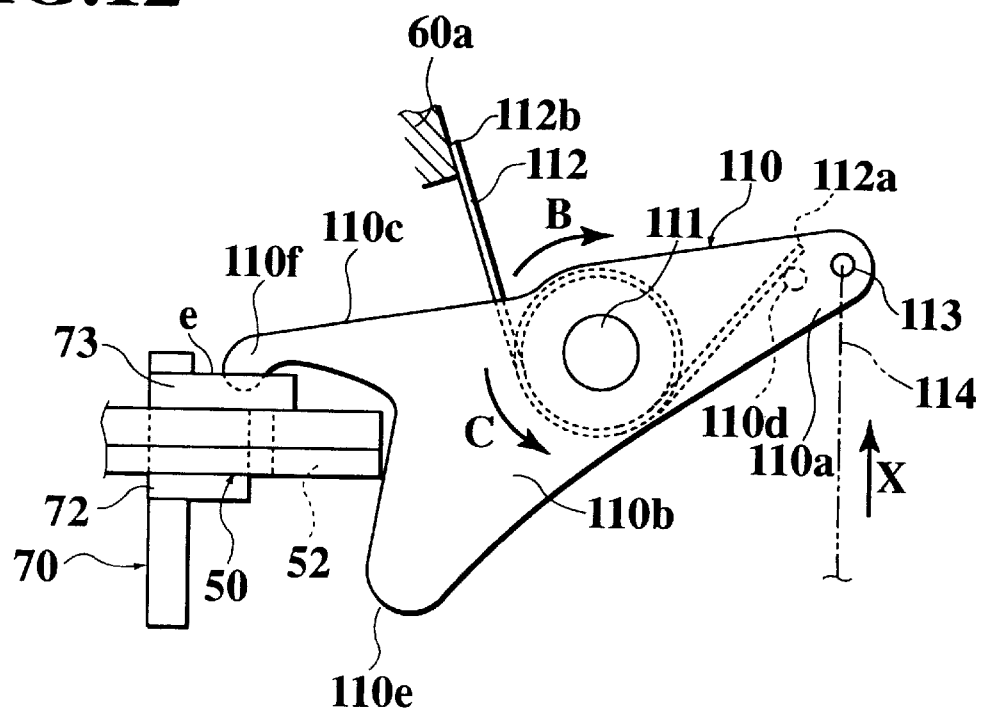
FIG. 12 is a plan view that shows the orientation of a key lock lever when the shift lever of the shift lever operating apparatus for an automatic transmission is shifted to a parking position.

And, it is set such that when the cam surface 110e of the key lock lever 110 is pressed by the engaging portion 52 of the selector member 50 when it is positioned at the parking position, the key lock lever 110 rotates in a direction of an arrow C in FIG. 12 against the spring force of the torsion coil spring 112, so that the convex portion 110f of the key lock lever 110 is brought into contact with the e surface of the key lock lever engaging portion 73 of the lock member 70 positioned at the lock position.

Next, an operation of the embodiment in accordance with the present invention will be described.

Figure 4:
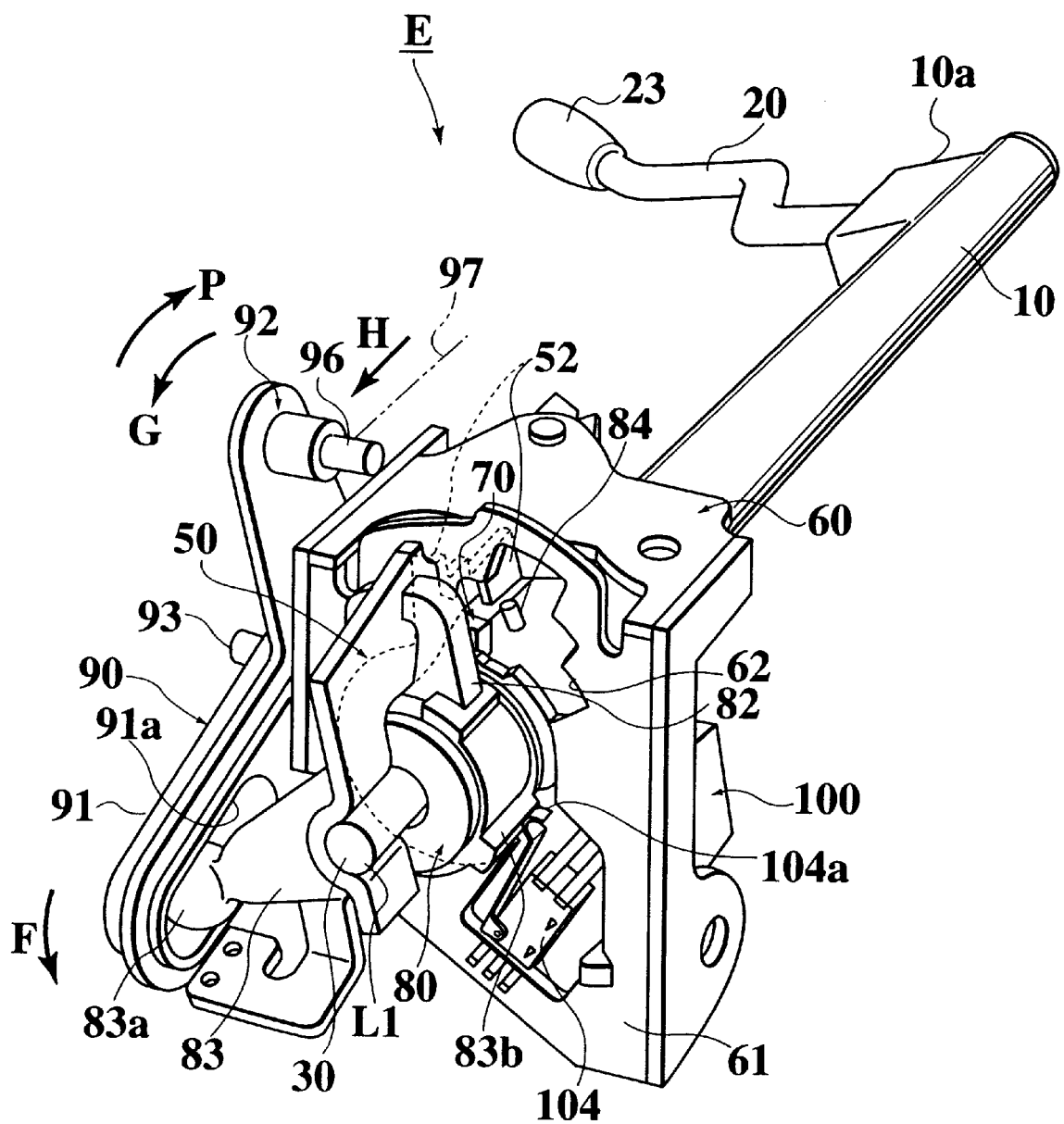
FIG. 4 is a perspective view of one embodiment of a shift lever operating apparatus for an automatic transmission designed in accordance with the present invention.
Figure 10:
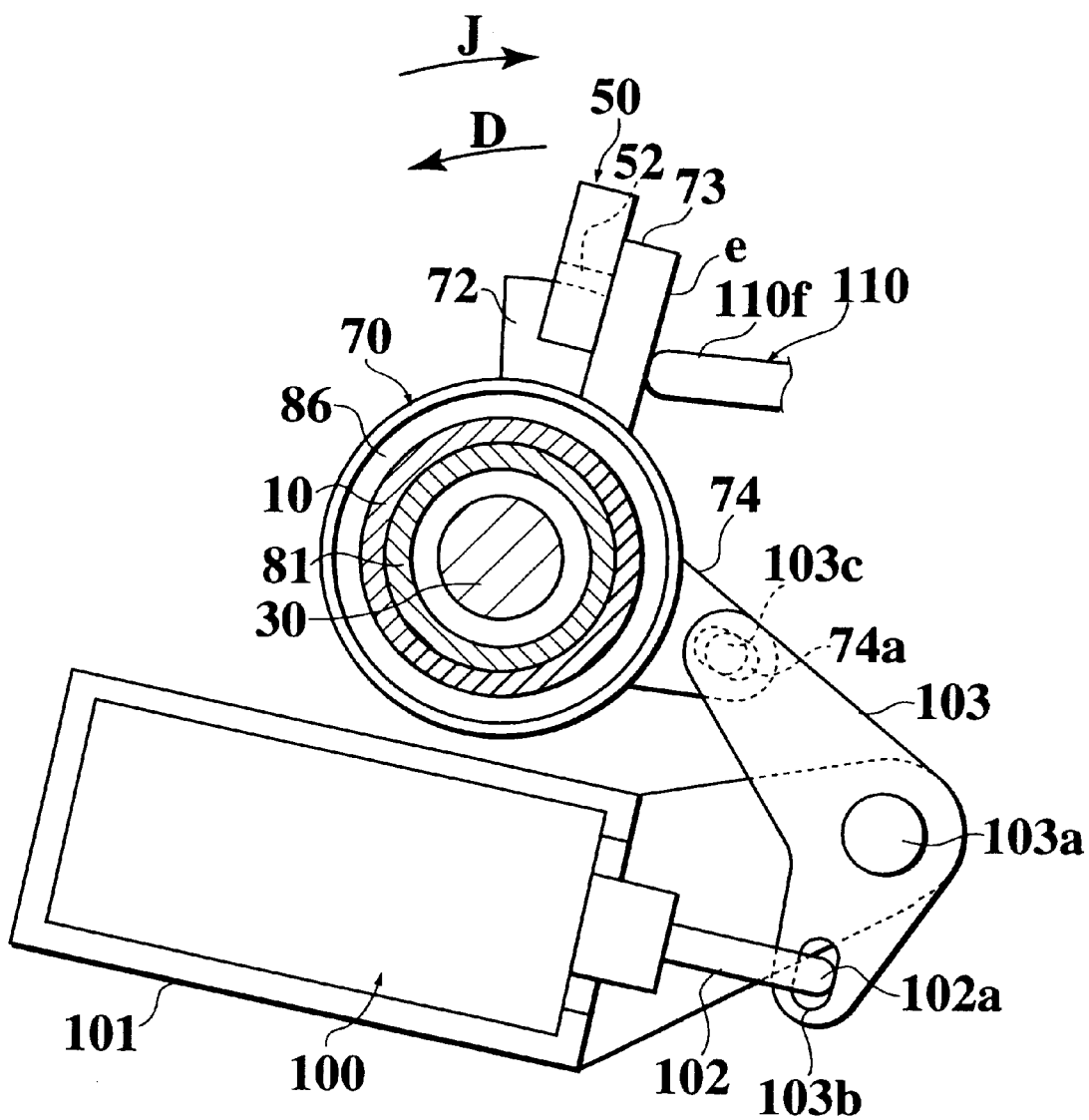
FIG. 10 is a side elevational view that shows the location of the lock member when the shift lever of the shift lever operating apparatus for an automatic transmission is shifted to a parking position.

At a time of parking when the shift lever 20 is shifted to the parking position and the engine key is taken out from the key interlock mechanism, the selector member 50, the lock member 70 and the key lock lever 110 are shown in FIGS. 4, 10 and 12.

Accordingly, the selector member 50 integrally rotates with the shift lever 20 and the control tube 10, and moves to a position at which the detent portion 51 thereof engages with the parking position groove of the detent groove 62. In accordance with this movement, as shown in FIG. 4, the arm member 80 rotates in a direction of an arrow F, and the operating member 90 rotates in a direction of an arrow G through the engaging portion 83a of the arm member 80. Accordingly, the cable 97 is drawn in a direction of an arrow H and the automatic transmission is operated.

Further, in this state, the convex portion 83b of the arm member 80 is brought into contact with a contact point 104a of a park switch 104 and the park switch 104 is turned on, so that the solenoid 100 is in an electrically excited state. Then, as shown in FIG. 10, the plunger 102 is pulled inwardly, the lock member 70 rotates in a direction of an arrow D through the link member 103, and the lock portion 72 moves to a position capable of engaging with the engaging portion 52 of the selector member 50.

Still further, as shown in FIG. 12, the cam surface 110e of the key lock lever 110 is pressed by the engaging portion 52 of the selector member 50, and the key lock lever 110 rotates in a direction of an arrow C against the spring force of the torsion coil spring 112. Accordingly, the key lock cable 114 is drawn in a direction of an arrow X, the engine key is removed from the key interlock mechanism, and the convex portion 110f of the key lock lever 110 is brought into contact with the e surface in the key lock lever engaging portion 73 of the lock member 70. When the engine key is taken out, the key lock cable 114 and key lock lever 110 are locked and the electrical excitation of the solenoid is canceled, so that the plunger 102 projects outwardly so as to rotate the lock member 70 in a direction of an arrow J in FIG. 10, however, the rotation is prevented by the convex portion 110f of the key lock lever 110. As mentioned above, the lock member 70 is locked to the lock position by the key lock lever 110.

In this state, even when the shift lever 20 is operated in the selecting direction in order to take off the detent portion 51 of the selector member 50 from the parking position groove in the detent groove 62, as shown in FIG. 8, the b surface of the engaging portion 52 in the selector member 50 is brought into contact with the a surface of the lock portion 72 in the lock member 70, thereby restricting the operation of the shift lever in the selecting direction. Accordingly, it is possible to lock the shift lever 20 in the parking position.

At a time of shifting the shift lever 20 from the shift lock state to the running position, at first the engine key is inserted into the key interlock mechanism, thereby starting the engine. Then, the plunger 102 is pulled inward by turning on electricity to the solenoid 100, and the lock of the key lock cable 114 is canceled.

Figure 7:
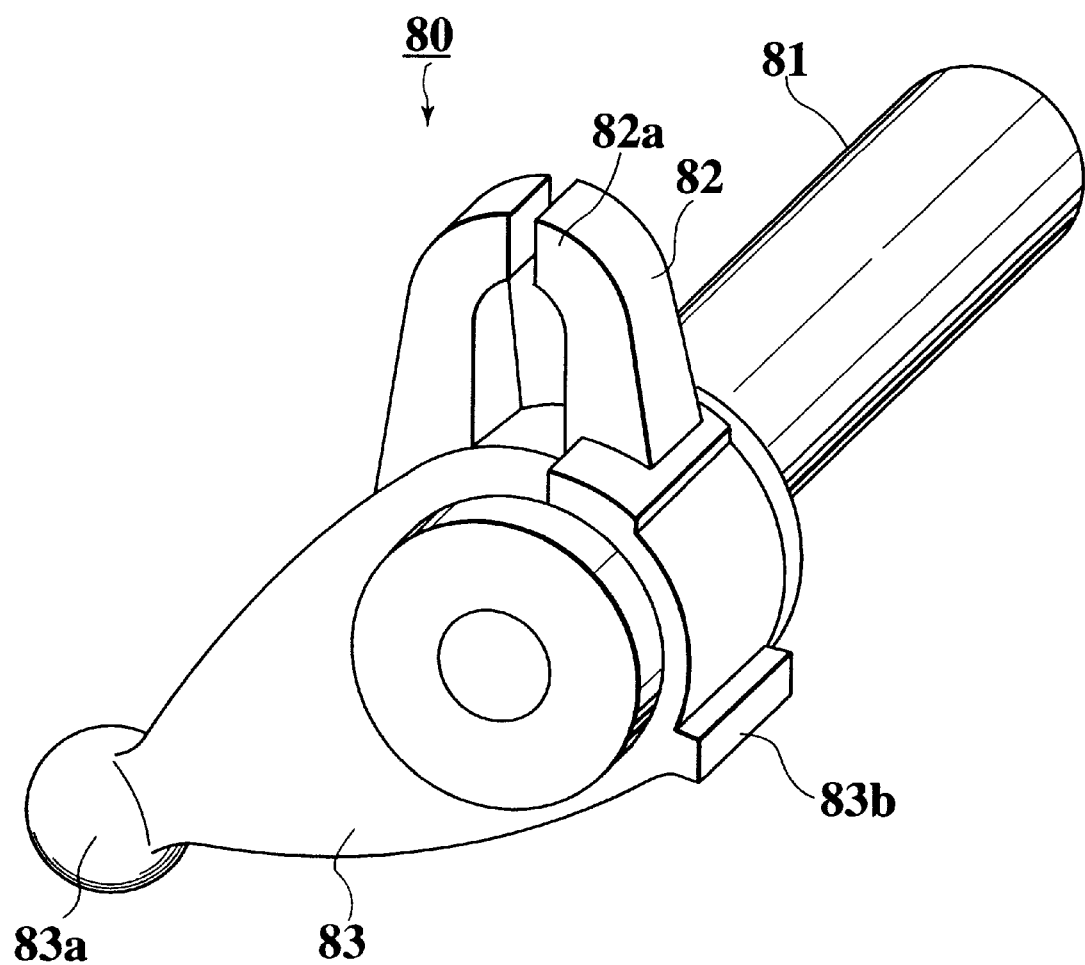
FIG. 7 is a perspective view of an arm member of the shift lever operating apparatus for an automatic transmission designed in accordance with the present invention.

Next, when the brake is stepped on, the brake switch (not shown) is turned on and this turns off electricity to the solenoid 100 is shut and the excitation of the solenoid 100 is canceled, so that the plunger 102 is projected outwardly so as to rotate the lock member 70 in a direction of an arrow J in FIG. 7, however, this rotation is prevented by the convex portion 110f of the key lock lever 110. In this case, when the shift lever 20 is rotated in a direction of an arrow K in FIG.

Figure 13:
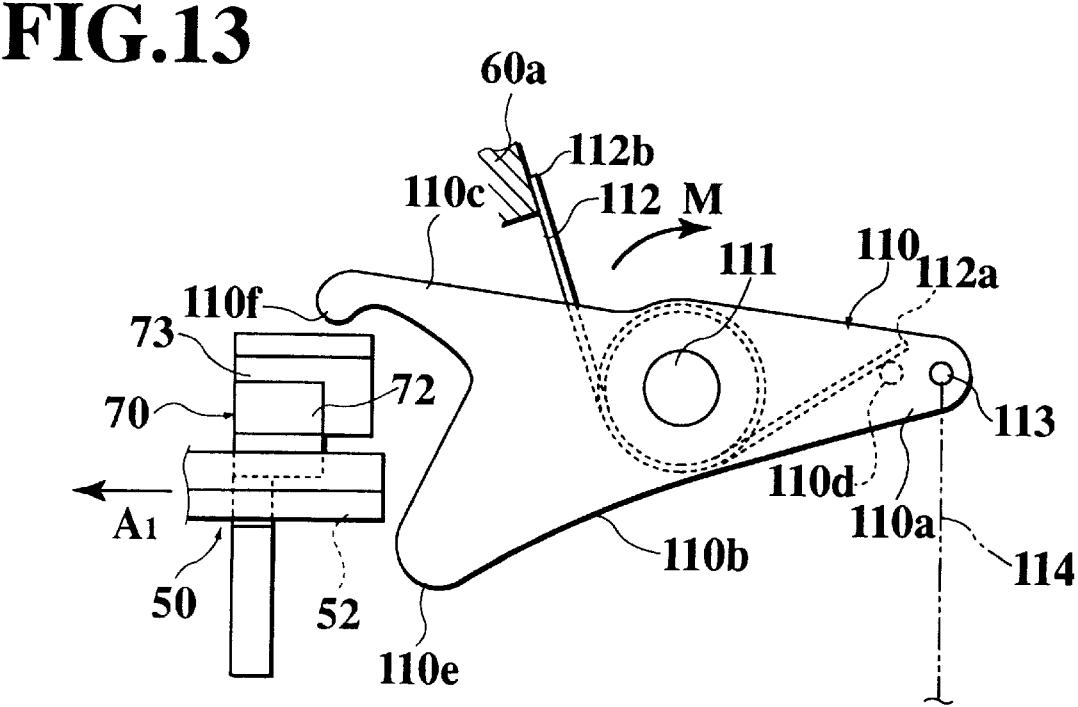
FIG. 13 is a plan view that shows the key lock lever when the shift lever of the shift lever operating apparatus for an automatic transmission is shifted to a running position.

5 against the spring force of the return spring 40, and the selector member 50 is moved in a direction of an arrow A1 as shown in FIG. 13, an engagement between the engaging portion 52 of the selector member 50 and the cam surface 110e of the lock lever 110 is canceled as shown in the drawing, and the key lock lever 110 is rotated in a direction of an arrow M by the spring force of the torsion coil spring 112 as shown in the drawing, so that the key lock cable 114 is loosened, thereby becoming a state of not taking out the engine key from the key interlock mechanism.

Figure 11:
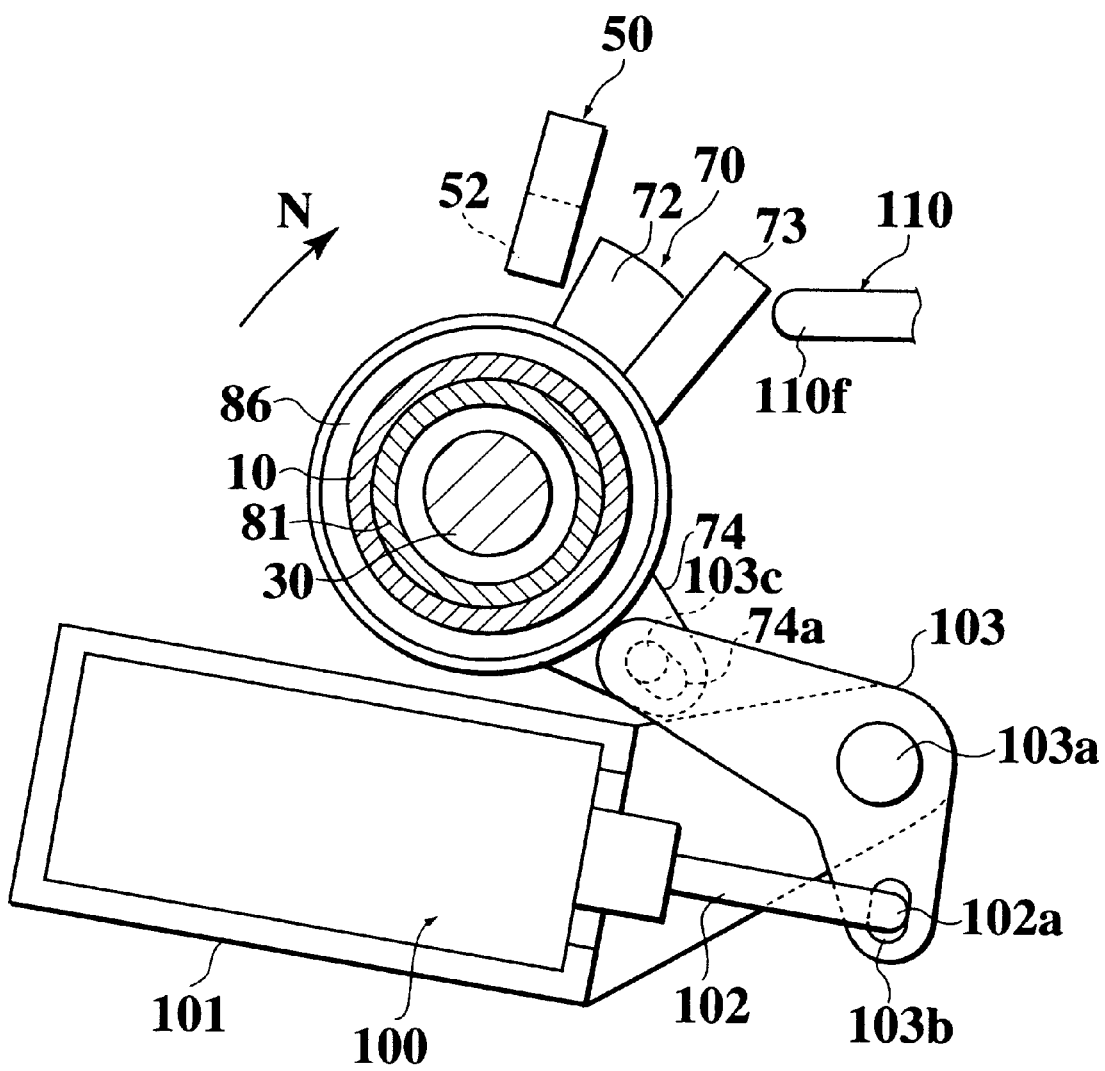
FIG. 11 is a side elevational view that shows the location of the lock member when the shift lever of the shift lever operating apparatus for an automatic transmission is shifted to a running position.

Further, the engagement between the key lock lever engaging portion 73 of the lock member 70 and the convex portion 110f of the key lock lever 110 is canceled and the lock member 70 rotates in a direction of an arrow N as shown in FIG. 11, so that the lock portion 72 of the lock member 70 is retracted from a moving track of the engaging portion 52 of the selector member 50.

In this state, when the shift lever 20 is further rotated in the direction of the arrow K, the detent portion 51 of the selector member 50 is taken out from the parking position groove. In this case, when the shift lever 20 is rotated around an axis of the control tube 10 and the shift lever 20 is detached in a portion where the detent portion 51 of the selector member 50 reaches a predetermined running position groove, the detent portion 51 is locked with the predetermined running position groove due to the spring force of the return spring 40.

In order to again shift the shift lever 20 to the parking position from another position the shift lever 20 is rotated around the axis of the control tube 10 after rotating the shift lever 20 in a direction of an arrow K in FIG. 5 against the spring force of the return spring 40 so as to take out the detent portion 51 of the selector member 50 from the running position groove.

Further, in this state, namely before the detent portion 51 has reached the parking position, the convex portion 83b of the arm member 80 is brought into contact with the contact point 104a of the park switch 104 and the park switch 104, shown in FIG. 4, is turned on, so that the solenoid 100 is in an excited state. Consequently, the lock portion 72 of the lock member 70 is brought into contact with the side face of the detent portion 51.

When the shift lever 20 is detached in the portion where the detent portion 51 of the selector member 50 reaches the parking position, the detent portion 51 of the selector member 50 is locked with the parking position groove due to the spring force of the return spring 40. Then, as mentioned above, the lock member 70 rotates to a position at which the lock portion 72 and the engaging portion 52 of the selector member 50 are opposed to each other. Further, the key lock lever 110 rotates to a position shown in FIG. 12, thereby becoming a state in which the engine key can be taken out from the key lock mechanism as mentioned above. Accordingly, the shift lever 20 can be locked with the parking position.

Assembly of the shift lever operating apparatus E for an automatic transmission structured in the manner described above is performed by inserting the mounting tube 81 of the arm member 80, the spring sheet 42 and the return spring 40 to the compression rod 30 in which the selector member 50 is fixed to the end portion L1 apart from the shift lever 20, and pressing the spring receiving pin 41 after inserting the spring sheet 42, thereby preventing it from coming off. Next, the spacer 87, the detent bracket 60, the lock member 70 and the spacer 86 are inserted into the outer periphery of the mounting tube 81 of the arm member 80.

Then the control tube 10 is inserted over the compression rod 30 and the mounting tube 81 and the mounting pin 84 is pressed through the mounting tube 81 and the control tube 10 so as to fix both.

Accordingly, the end portion L1 apart from the shift lever 20 of the control tube 10 is rotatably supported to the detent bracket 60 through the mounting tube 81.

Figure 1:
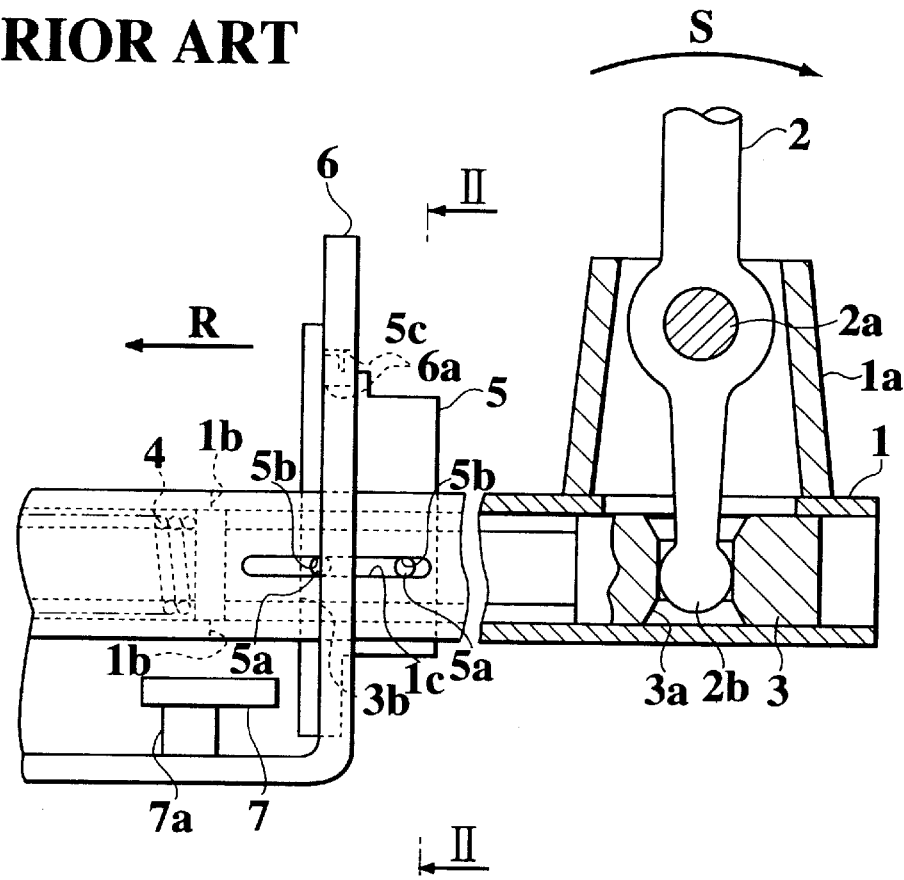
FIG. 1 is a cross-sectional view of a prior art embodiment of a shift lever operating apparatus for an automatic transmission.

In accordance with the shift lever operating apparatus E for an automatic transmission structured in the above manner, since the detent plate 61 of the detent bracket 60 extends in perpendicular to the control tube 10 and rotatably supports the end portion L1 apart from the shift lever 20, and the detent groove is formed on the same surface as the supporting portion, in comparison with the conventional structure (shown in FIGS. 1–3) in which detent bracket 6 is arranged in the middle portion of the control tube 1, the rigidity can be improved and the detent bracket 60 can be made compact.

Further, since the selector member 50 is fixed to the end portion of the compression rod 30 projecting from the end portion L1 apart from the shift lever 20 of the control tube 10, it is not necessary to form the oblong holes 1b and 1c on the outer peripheral surface of the control tube 10 in accordance with the conventional art, so that the control tube 10 can be easily worked and the rigidity can be widely improved, thereby making the control tube 10 compact and thin, that is, light. Further, since the assembly of the shift lever 20 operating apparatus E can be performed in such a manner as to insert to the compression rod 30 from the end portion close to the shift lever one by one, a better assembling characteristic can be obtained and the structure can be made simple.

Further, since the selector member 50 is held by the arm member 80 fixed to the end portion L1 apart from the shift lever 20 of the control tube 10 and is integrally rotated with the control tube 10, the operation of the shift lever 20 can be properly transmitted to the selector member 50, so that the operation is easier.

Further, since the selector member 50 is held by the holding portion 82 of the arm member 80, the deformation of the selector member 50 can be restricted and the strength can be improved, so that the selector member 50 can be made compact and thin, that is, light.

Still further, since the holding portion 82 of the arm member 80 is arranged near the detent bracket 60, the load acts on a direction of shearing the selector member 50 by the holding portion 82 and the detent plate 61, so that the strength can be widely improved, the deformation of the selector member 50 can be further restricted, and the selector member 50 can be further made thin and light.

In accordance with the embodiment described above, since the lock portion 72 of the lock member 70 moves between the one side surface of the detent bracket 60 and the engaging portion 52 of the selector member 50, thereby restricting the movement in the axial direction of the selector member 50, the great load acting on the lock member 70 through the selector member 50 by the operation of the shift lever 20 at a time of shifting the shift lever 20 from the parking position is directly input to the detent bracket 60, and it is understood that the lock member 70 is sufficient as far as it has an enough strength to stand the compression force. Accordingly, the lock member 70 can be made compact and light, a mass of an inertia in the lock member 70 is reduced, thereby improving responsiveness of the lock member 70, and the cost can be reduced. Further, since the lock member 70 is slidably brought into contact with the one side surface of the detent bracket 60 and rotatably supported in a coaxial manner with the control tube 10, a space for mounting nd operating the lock member 70 can be made small and the mounting structure of the lock member 70 can be made simple.

By using the structure mentioned above, a sufficient strength can be obtained even by using a synthetic resin in place of a metal material for the lock member 70, and when the synthetic resin is used, the lock member 70 can be further made light and the responsiveness can be improved.

Next, another embodiment will be described in detail with reference to FIGS. 14 to 20 and the drawings relating to the first and second embodiments.

Figure 16:
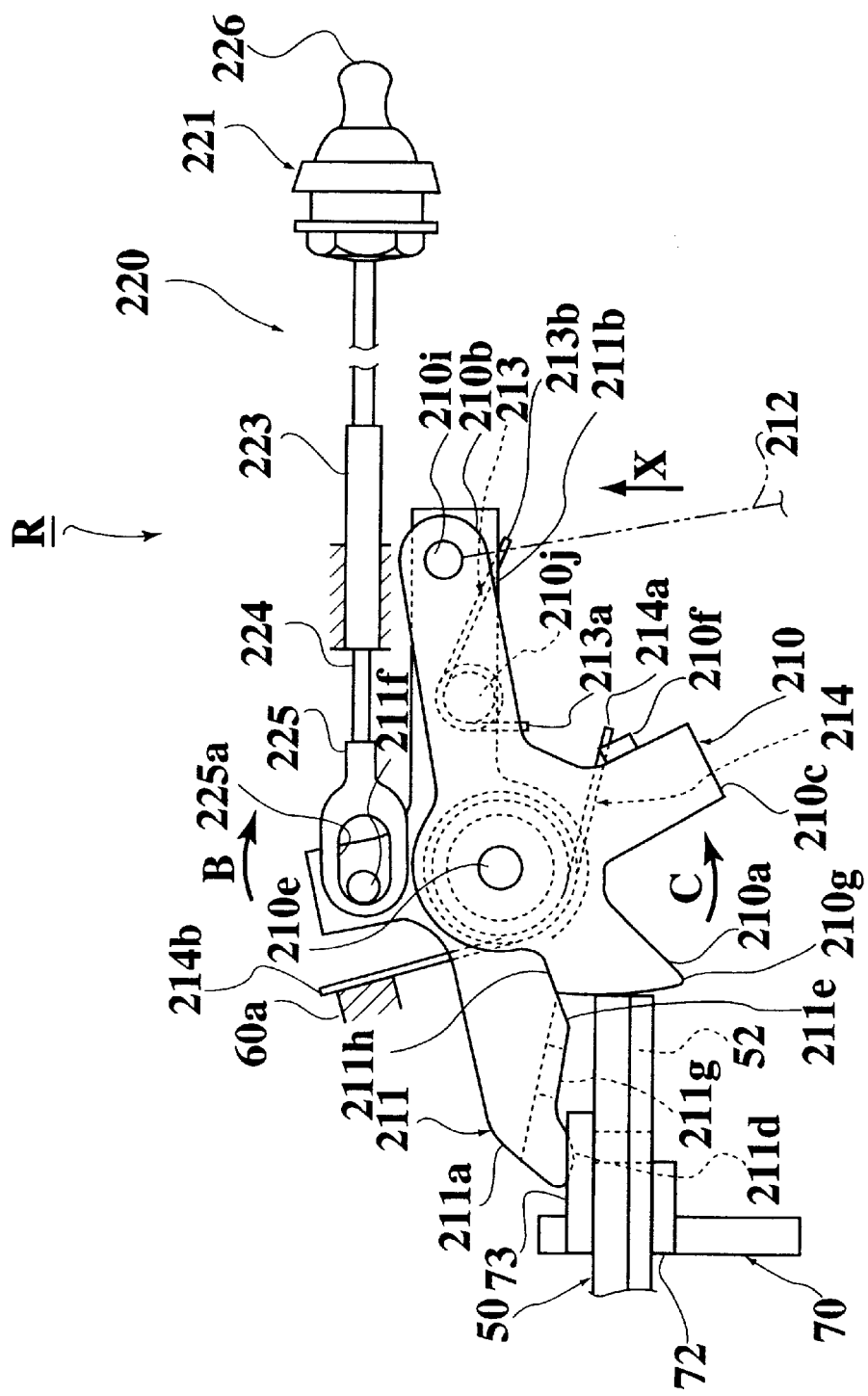
FIG. 16 is a plan view that shows a forcibly lock canceling mechanism when shifting a shift lever of a shift lever operating apparatus for an automatic transmission designed in accordance with the present invention.
Figure 17:
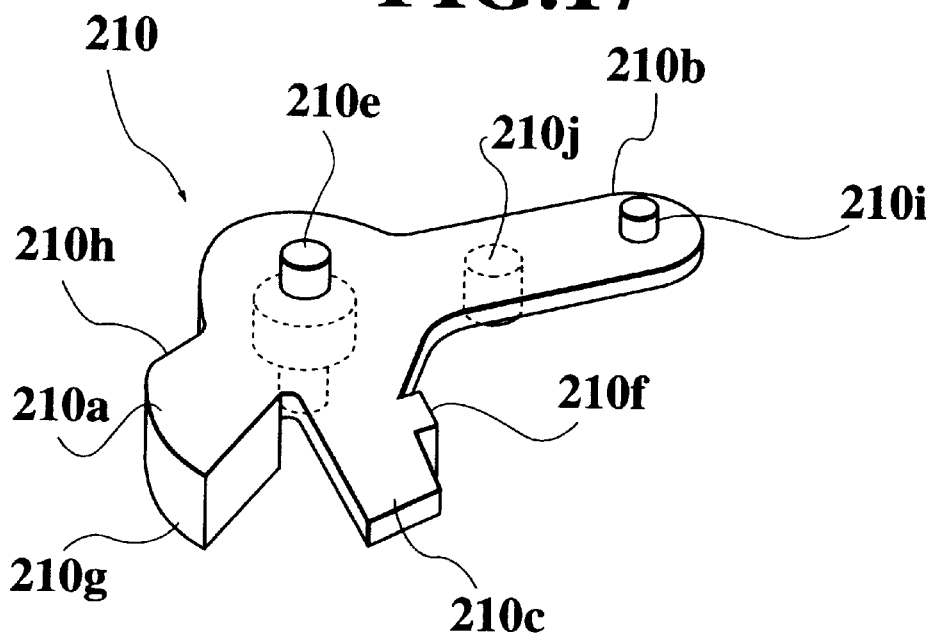
FIG. 17 is a perspective view of a first key lock lever of the shift lever operating apparatus for an automatic transmission designed in accordance with the present invention.
Figure 18:
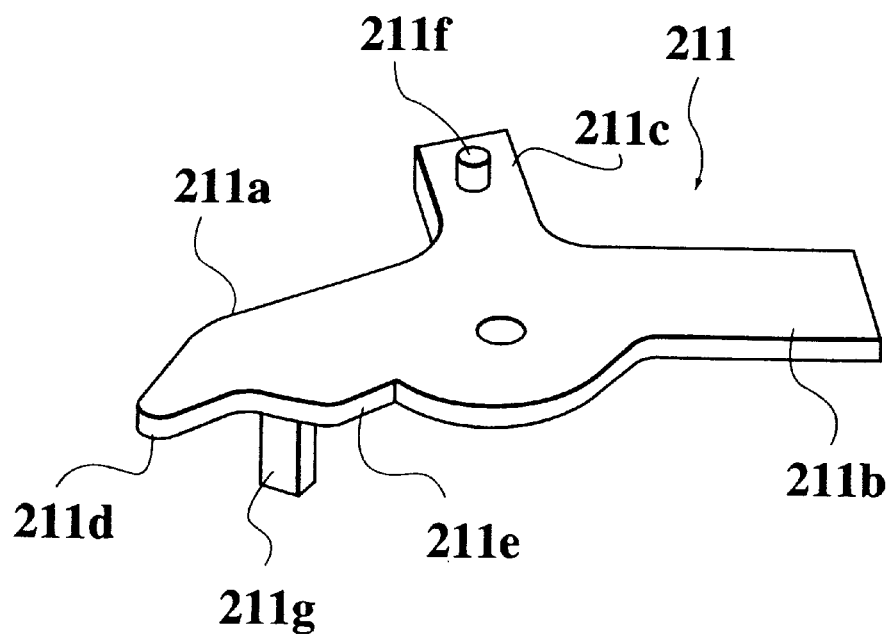
FIG. 18 is a perspective view of a second key lock lever of the shift lever operating apparatus for an automatic transmission designed in accordance with the present invention.

A shift lever operating apparatus in accordance with the embodiment further comprises a detent bracket 60 rotatably supporting the end portion apart from the shift lever 20 of the control tube 10, and a lock mechanism R shown in FIG. 16, interlocked with a known key interlock mechanism (not shown) capable of inserting and taking out an engine key (not shown) at a time of shifting the shift lever 20 to the parking position, and interlocking with a brake (not shown) so as to restrict a movement from a parking position to the other positions of the shift lever 20.

Figure 14:
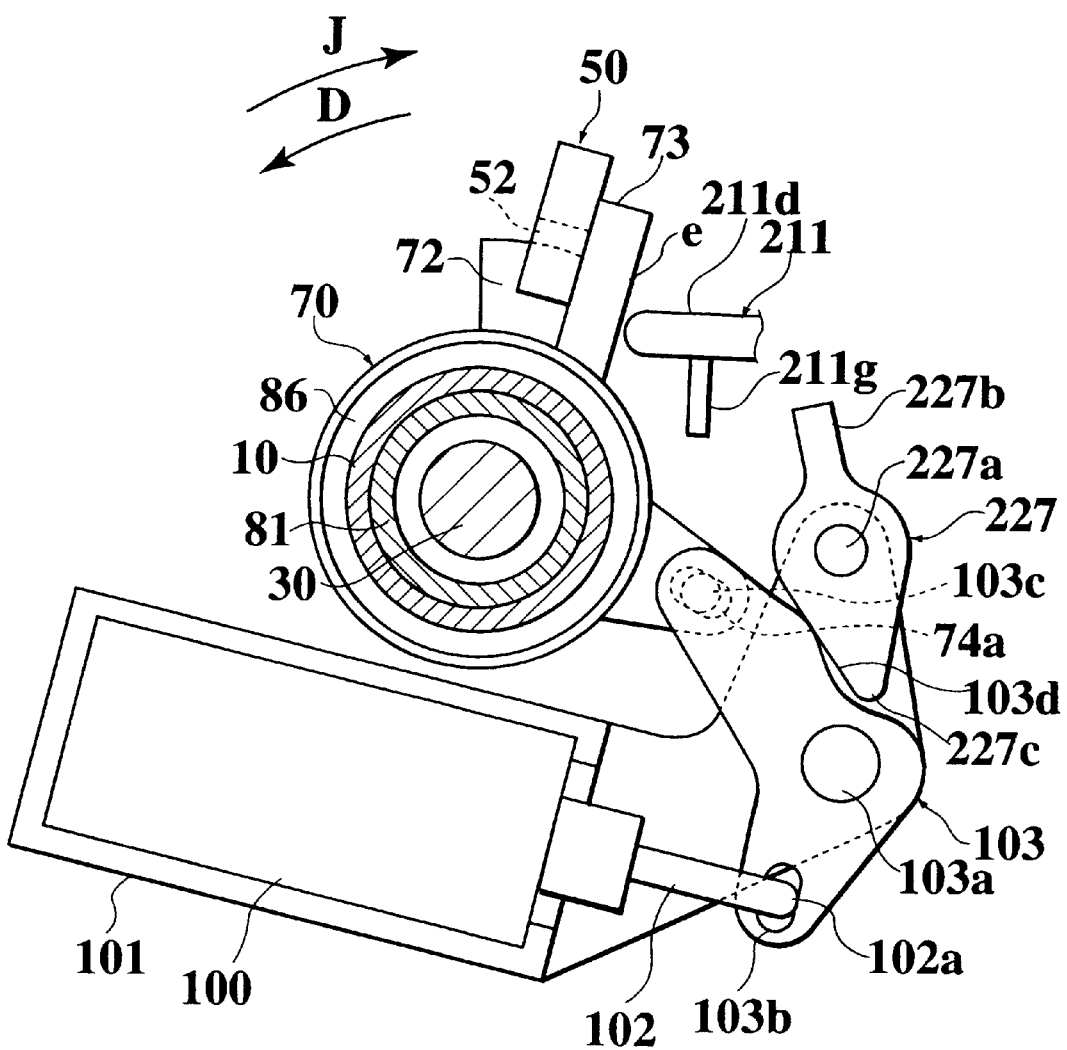
FIG. 14 is a side elevational view that shows an actuator forcibly driving means when shifting the shift lever of the shift lever operating apparatus for an automatic transmission to a parking position.

Lock mechanism R is structured such as to engage with the selector member 50 when positioned at the parking position so as to restrict the selecting operation of the shift lever 20 shown in FIG. 4, rotatably supported in a coaxial manner with the control tube 10 in such a manner as to move from the locked position engaging with the selector member 50 to the unlocked position canceling the engagement, axially and rotatably attached to the lock member 70 connected to the solenoid 100 shown in FIG. 14 and operating as an actuator interlocking with the brake and the detent bracket 60, and formed in such a manner as to engage with the side apart from the selecting direction with respect to the selector member 50 positioned at the parking position. Further, the lock mechanism R is axially attached to a first key lock lever 210 interlocked with the key interlock mechanism through a key lock cable 212 as a transmission member and an axially attaching portion the same as the first key lock lever 210, connected to the first key lock lever 210 by a torsion coil spring 213 as urging means in such a manner as to integrally rotate therewith, and provided with a second key lock lever 211 engageably structured in such a manner as to restrict the rotation to the unlocked position with respect to the lock member 70 positioned at the locked position when the first key lock lever 210 engages with the selector member 50, and a forcibly lock canceling mechanism 220 forcibly canceling the engagement between the second key lock lever 211 and the lock member 70 positioned at the locked position by a manual operation, and forcibly rotating the lock member 70 positioned at the locked position to the unlocked position by a manual operation.

Further, the forcibly lock canceling mechanism 220 is constituted by second key lock lever forcibly driving means 221 provided in the second key lock lever 211 for forcibly canceling the second key lock lever 211 engaging with the lock member 70 positioned at the locked position by a manual operation, and actuator forcibly driving means 222 provided between the second key lock lever 211 and the solenoid 100 for forcibly driving the solenoid 100 in interlocking with the motion of the second key lock lever forcibly driving means 221 and rotating the lock member 70 positioned at the locked position to the unlocked position.

The engaging pin 103c formed in the front end of the other arm portion in the link member 103 is loosely fitted to the oblong hole 74a formed in the connecting portion 74 provided on the outer peripheral surface of the base portion 71 in the lock member 70 in a projecting manner. Further, on the upper surface of the other arm portion in the link member 103, a cam surface 103d capable of engaging with a drive member 227 and a drive portion 227c mentioned below are formed.

The first key lock lever 210 is preferably made of a synthetic resin, and arranged perpendicular to the lock portion 72 of the lock member 70, and constituted by arm portions 210a, 210b and 210c extending to three portions from the base portion. Further, the first key lock lever 210 is axially attached to the detent bracket 60 by a mounting shaft 210e formed perpendicular to the base portion, a torsion coil spring 214 is wound around the mounting shaft 210e, one hook portion 214a of the torsion coil spring 214 and the other hook portion 214b are, respectively, locked with a lock portion 210f formed in the arm portion 210c and the lock portion 60a formed in the detent bracket 60, and the first key lock lever 210 is urged in such a manner as to rotate in a direction of an arrow B in FIG. 16 by the torsion coil spring 214.

A cam surface 210g capable of engaging with the engaging portion 52 of the selector member 50 when positioned at the parking position and a contact surface 210h with which a contact surface 211e mentioned below and formed in a second key lock lever 211 in a continuous manner with the cam surface 210g is brought into contact are, respectively, formed in the arm portion 210a of the first key lock lever 210. Further, a key lock cable 212, interlocking with the key interlock mechanism, is connected to a mounting pin 210i formed in the front end of the arm 210b.

When the cam surface 210g of the first key lock lever 210 is pressed by the engaging portion 52 of the selector member 50 when it is positioned at the parking position, the first key lock lever 210 rotates to a direction of an arrow C in FIG. 16 against the spring force of the torsion coil spring 214 together with the second key lock lever 211, and a convex portion 211d of the second key lock lever 211 is brought into contact with a surface of the key lock lever engaging portion 73e of the lock member 70 positioned at the locked position.

Further, the lock member 70 positioned at the locked position is prevented from rotating to the canceling direction by the second key lock lever 211. The second key lock lever 211 is preferably made of a synthetic resin, arranged in parallel to and below the first key lock lever 210, and constituted by arm portions 211a, 211b and 211c extending to three portions from the base portion. The base portion of the second key lock lever 211 is rotatably supported to the mounting shaft 210e of the first key lock lever 210.

A convex portion 211d in which the cam surface 210g of the first key lock lever 210 can engage with the key lock lever engaging portion 73 of the lock member 70 positioned at the locked position in a state of engaging with the engaging portion 52 of the selector member 50 is formed in the front end of the arm portion 211a. Further, a contact surface 211e capable of being brought into contact with the contact surface 210h of the first key lock lever 210 is formed in the side close to the base portion of the arm portion 211a.

The torsion coil spring 213 is structured such that the base portion is wound around a spring mounting shaft 210j formed in the arm portion 210b of the first key lock lever 210. One hook portion 213a of the torsion coil spring 213 and the other hook portion 213b are, respectively, locked with the arm portion 210b of the first key lock lever 210 and the arm portion 211b of the second key lock lever 211, and the contact surface 211e of the second key lock lever 211 is brought into pressing contact with and engaged with the contact surface 210h of the first key lock lever 210 by the torsion coil spring 213. Accordingly, the first key lock lever 210 and the second key lock lever 211 are always rotated in an integral manner.

A forcibly lock canceling mechanism 220 is constituted by second key lock lever forcibly driving means 221 and actuator forcibly driving means 222.

The second key lock lever forcibly driving means 221 is provided with a slidable cable 224 in a pipe 223 mounted to the detent bracket 60 end, and a mounting piece 225 and a grip portion 226 are respectively mounted to one end of the cable 224 and the other end thereof. An oblong hole 225a is formed in the mounting piece 225, and a connecting pin 21 If formed in the arm portion 211c of the second key lock lever 211 is loosely fitted to the oblong hole 225a.

When the grip portion 225 is gripped and the cable 224 is drawn in a direction of an arrow Q in FIG. 20 against a spring force of the torsion coil spring 213, the second key lock lever 211 rotates in a clockwise direction.

The actuator forcibly driving means 222 is constituted by a projecting piece 211g provided in a middle portion between the convex portion 211d of the arm portion 211a of the second key lock lever 211 and the contact surface 211e, and a drive member 227 axially attached to the mounting shaft 227a of the solenoid case 101 between the projecting piece 211g and the link member 103.

An engaging portion 227b capable of engaging with the projecting piece 211g of the second key lock lever 211 and a drive portion 227c capable of being brought into contact with the cam surface 103d of the link member 103 are respectively formed in the upper portion and the lower portion of the drive member 227.

Further, it is structured such as to press the engaging portion 227b of the drive member 227 by the projecting piece 211g of the second key lock lever 211 so as to rotate the drive member 227 in a clockwise direction, to rotate the link member 103 in a counterclockwise direction through the drive portion 227c and the cam portion 103d and to rotate the lock member 70 in a clockwise direction, that is, in an unlocked direction.

Next, an operation of the embodiment in accordance with the present invention will be described below.

When parking the shift lever 20 is shifted to the parking position and the engine key is removed from the key interlock mechanism, the selector member 50, the lock member 70, the first key lock lever 210 and the second key lock lever 211 are oriented as shown in FIGS. 14 and 16.

Accordingly, the selector member 50 integrally rotates with the shift lever 20 and the control tube 10, and moves to a position at which the detent portion 51 thereof engages with the parking position groove of the detent groove 62. In accordance with this movement, as shown in FIG. 16, the arm member 80 rotates in a direction of an arrow F, and the operating member 90 rotates in a direction of an arrow G through the engaging portion 83a of the arm member 80. Accordingly, the cable 97 is drawn in a direction of an arrow H and the automatic transmission is operated.

Further, in this state, namely before the detent portion 51 has reached the parking position, the convex portion 83b of the arm member 80 is brought into contact with the contact point 104a of the park switch 104 and the park switch 104 is turned on, so that the solenoid 100 is in an excited state. Then, as shown in FIG. 14, the plunger 102 is pulled inward and the lock member 70 rotates in a direction of an arrow D through the link member 103, and the lock portion 72 moves to a position capable of engaging with the engaging portion 52 of the selector member 50.

Still further, as shown in FIG. 16, the cam surface 210g of the first key lock lever 210 is pressed by the engaging portion 52 of the selector member 50, and the first key lock lever 210 rotates in a direction of an arrow C against the spring force of the torsion coil spring 214 in an integral manner with the second key lock lever 211. Accordingly, the key lock cable 212 is drawn in a direction of an arrow X, the engine key is removed from the key interlock mechanism, and the convex portion 211d of the second key lock lever 211 is brought into contact with the e surface in the key lock lever engaging portion 73 of the lock member 70.

When the engine key is removed, the key lock cable 212, that is, the first key lock lever 210 is locked, and the excitation of the solenoid 100 is canceled, so that the plunger 102 projects outward so as to rotate the lock member 70 in a direction of an arrow J in FIG. 14, however, the rotation is prevented by the convex portion 211d of the second key lock lever 211.

In this state, even when the shift lever 20 is operated in the selecting direction in order to take off the detent portion 51 of the selector member 50 from the parking position groove in the detent groove 62, as shown in FIG. 8, the b surface of the engaging portion 52 in the selector member 50 is brought into contact with the a surface of the lock portion 72 in the lock member 70, thereby restricting the operation of the shift lever 20 in the selecting direction. Accordingly, it is possible to lock the shift lever 20 in the parking position.

When shifting the shift lever 20 from the shift lock state to the running position, first the engine key is inserted to the key interlock mechanism, thereby starting the engine. Next, the plunger 102 is pulled inwardly by turning on electricity to the solenoid 100, and the lock of the key lock cable 212 is canceled.

Next, when the brake is stepped on, the brake switch (not shown) is turned on, and the electricity to the solenoid 100 is turned off and the excitation of the solenoid 100 is canceled, so that the plunger 102 is projected outward so as to rotate the lock member 70 in a direction of an arrow J in FIG. 14, however, this rotation is prevented by the convex portion 211d of the second key lock lever 211. In this case, when the shift lever 20 is rotated in a direction of an arrow K in FIG. 5 against the spring force of the return spring 40, and the selector member 50 is moved in a direction of an arrow Al as shown in FIG. 19, an engagement between the engaging portion 52 of the selector member 50 and the cam surface 210g of the first key lock lever 210 is canceled as shown in the drawing, and the first key lock lever 210 and the second key lock lever 211 are rotated in a direction of an arrow M by the spring force of the torsion coil spring 214 as shown in the drawing, so that the key lock cable 212 is loosened, thereby becoming a state of not taking out the engine key from the key interlock mechanism.

Figure 15:
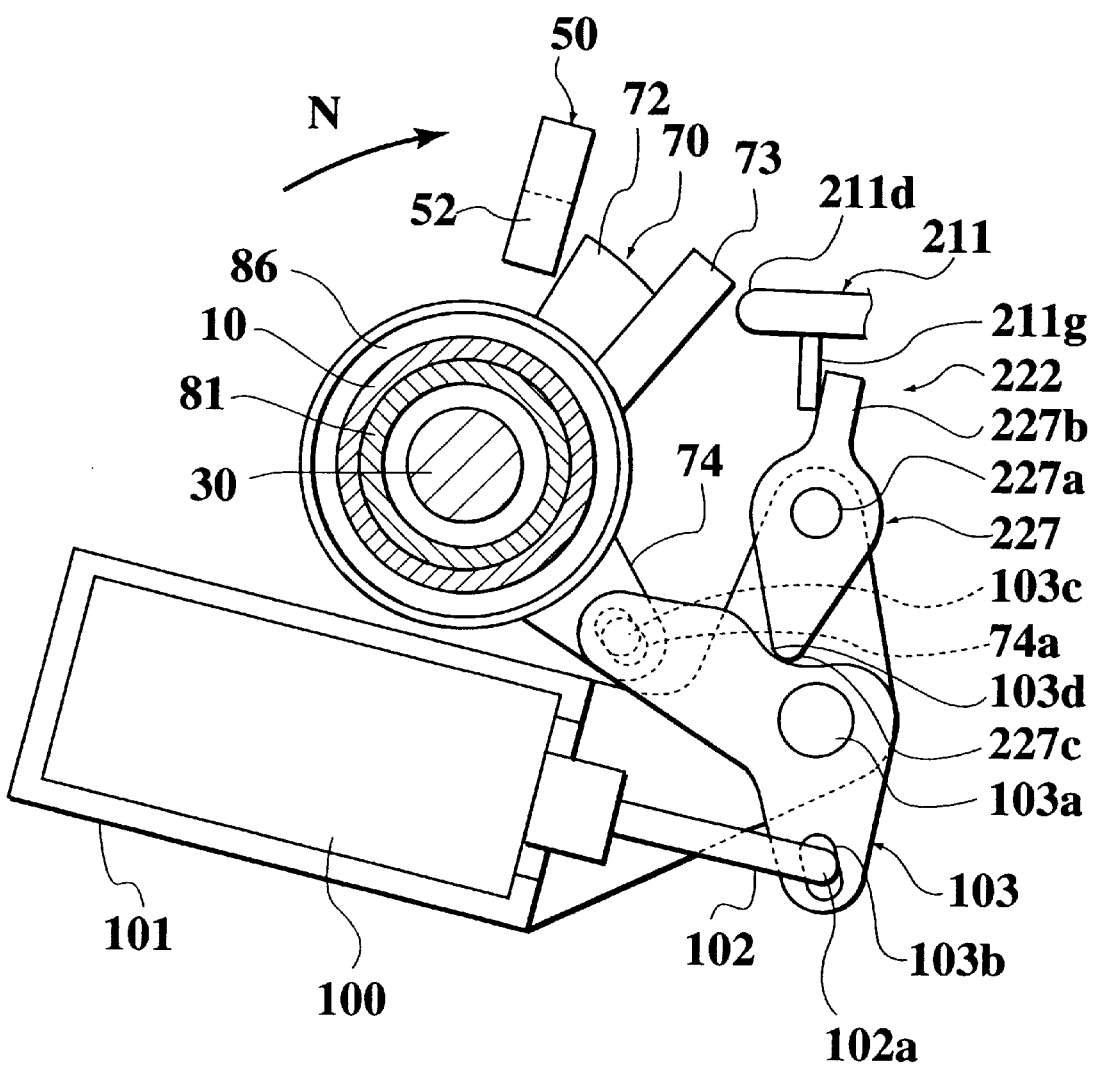
FIG. 15 is a side elevational view that shows the actuator forcibly driving means when shifting the shift lever of the shift lever operating apparatus for an automatic transmission to a running position.

Further, the engagement between the key lock lever engaging portion 73 of the lock member 70 and the convex portion 211d of the second key lock lever 211 is canceled and the lock member 70 rotates in a direction of an arrow N as shown in FIG. 15, so that the lock portion 72 of the lock member 70 is retracted out of a moving track of the engaging portion 52 of the selector member 50.

In this state, when the shift lever 20 is further rotated in the direction of the arrow K, the detent portion 51 of the selector member 50 is taken out from the parking position groove. In this case, when the shift lever 20 is rotated around an axis of the control tube 10 and the shift lever 20 is detached in a portion where the detent portion 51 of the selector member 50 reaches a predetermined running position groove, the detent portion 51 is locked with the predetermined running position groove due to the spring force of the return spring 40, thereby shifting the shift lever 20 to a predetermined running position.

Figure 3:
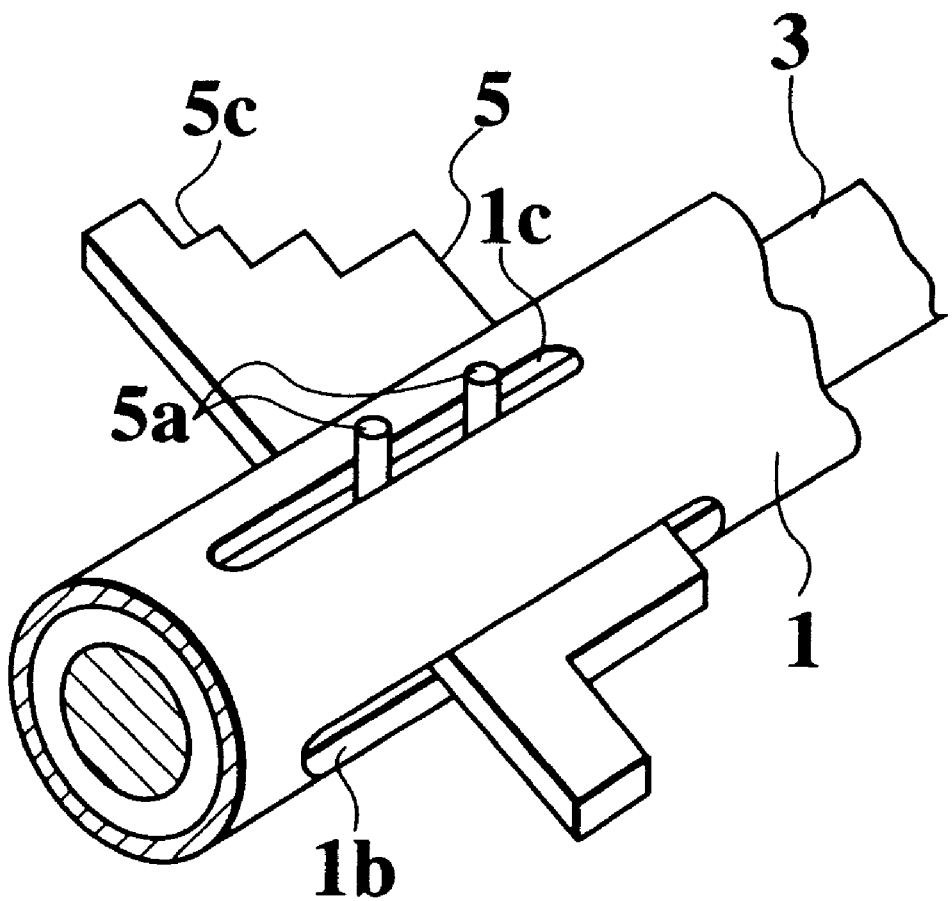
FIG. 3 is a perspective view of a prior art selector member mounted to a control tube of the shift lever operating apparatus for an automatic transmission.

In order to again shift the shift lever 20 to the parking position, the shift lever 20 is rotated around the axis of the control tube 10 after rotating the shift lever 20 in a direction of an arrow K in FIG. 3 against the spring force of the return spring 40 so as to take out the detent portion 51 of the selector member 50 from the running position groove.

When the shift lever is detached in the portion where the detent portion 51 of the selector member 50 reaches the parking position, the detent portion 51 of the selector member 50 is locked with the parking position groove due to the spring force of the return spring 40. Then, as mentioned above, the lock member 70 rotates to a position at which the lock portion 72 and the engaging portion 52 of the selector member 50 are opposed to each other. Further, the first key lock lever 210 and the second key lock lever 121 rotate to a position shown in FIG. 16, thereby permitting the engine key to be removed from the key interlock mechanism as mentioned above. Accordingly, the shift lever 20 can be locked in the parking position.

On the contrary, in the embodiment in accordance with the present invention, the shift lock is canceled in the following procedures in the case that the solenoid 100 is fixed in an excited state due to a trouble in an electric system and in the case when the engine key is not near at hand in a state that the shift lever 20 is locked at the parking position.

At first, as shown in FIG. 20, when the cable 224 is drawn to a direction of an arrow Q against a spring force of the torsion coil spring 213 with gripping the grip portion 226, the second key lock lever 211 rotates in a clockwise direction, so that the engagement between the convex portion 211*d* and the key lock lever engaging portion 73 of the lock member 70 is canceled.

At the same time, as shown in FIG. 15, the engaging portion 227*b* of the driving member 227 is pressed by the projecting piece 211*g* of the second key lock lever 211, so that the driving member 227 rotates in a clockwise direction, and the cam surface 103*d* of the link member 103 is pressed by the driving portion 227*c* so as to rotate in a counterclockwise direction. The lock member 70 rotated in a clockwise direction, that is, an unlocked direction in accordance with the rotation, so that the lock portion 72 is retracted out of the moving track of the engaging portion 52 in the selector member 50.

Accordingly, it is possible to forcibly cancel the shift lock of the shift lever 20 and to change the shift lever 20 from the parking position another position as mentioned above.

In accordance with the embodiment of the present invention mentioned above, since it is possible to separate and forcibly take off the second key lock lever 211 engaging with the lock member 70 positioned at the lock position from the first key lock lever 210 locked through the key lock cable 212 by the key interlock mechanism by means of the second key lock lever forcibly driving means 221, the shift lock of the shift lever 20 shifted to the parking position can be canceled even in the case when the engine key is not present.

Further, since the lock member 70 positioned at the locked position can be forcibly rotated to the unlocked position by the actuator forcibly driving means 222, the shift lock of the shift lever 20 shifted to the parking position can be canceled even in the case that the solenoid 100 is not operated due to trouble in the electric system.

While preferred embodiments of the present invention have been described using specific terms, such description is for illustrative purposes, and it is to be understood that changes and variations may be made without departing from the spirit or scope of the following claims.

We claim:

1. A shift lever operating apparatus for an automatic transmission, comprising:

a control tube rotatably supported in a side portion of a steering column;

a shift lever axially attached to said control tube;

a compression rod inserted into said control tube, said compression rod moving in an axial direction in accordance with operation of said shift lever and integrally rotating with said control tube;

a return spring pressing said compression rod in the axial direction toward said shift lever;

a selector member fixed to said compression rod;

a detent bracket having a plurality of detent grooves for selectively engaging said selector member and oriented perpendicular to said control tube and rotatably supporting an end portion of said control tube opposite said shift lever;

a lock member having a lock portion engaging with said selector member when said selector member is positioned at a parking position and thereby restricting the operation of said shift lever in a select direction; and an actuator rotating said lock member from a locked position engaging with said selector member to an unlocked position not in engagement with said selector member, wherein said selector member has an engaging portion located apart from a side surface of said detent bracket with a predetermined interval and perpendicular to the control tube;

said lock member including a base portion slidably contacting with said side surface of said detent bracket and rotatably supported in a coaxial manner on said control tube;

said lock portion projecting from an outer peripheral surface of said base portion; and said lock portion movable between said engaging portion of said selector member and said one side surface of said detent bracket by driving said actuator, thereby preventing said selector member from moving in the axial direction.

* * * * *